US011097959B2

(12) United States Patent
Choi

(10) Patent No.: US 11,097,959 B2
(45) Date of Patent: Aug. 24, 2021

(54) SOLAR DESALINATION SYSTEM

(71) Applicant: Peter B. Choi, St. Davids, PA (US)

(72) Inventor: Peter B. Choi, St. Davids, PA (US)

( * ) Notice: Subject to any disclaimer, the term of this patent is extended or adjusted under 35 U.S.C. 154(b) by 0 days.

(21) Appl. No.: 16/950,495

(22) Filed: Nov. 17, 2020

(65) Prior Publication Data

US 2021/0155504 A1 May 27, 2021

Related U.S. Application Data

(60) Provisional application No. 62/938,993, filed on Nov. 22, 2019.

(51) Int. Cl.
  *C02F 1/14* (2006.01)
  *C02F 1/04* (2006.01)
  *C02F 1/06* (2006.01)
  *F03G 6/06* (2006.01)
  *C02F 103/06* (2006.01)

(52) U.S. Cl.
  CPC ............... *C02F 1/14* (2013.01); *C02F 1/041* (2013.01); *C02F 1/06* (2013.01); *F03G 6/067* (2013.01); *C02F 2103/06* (2013.01); *C02F 2201/009* (2013.01); *F03G 2006/061* (2013.01); *F03G 2006/062* (2013.01)

(58) Field of Classification Search
  CPC .... C02F 1/14; C02F 1/04; C02F 1/041; C02F 1/06; F03G 6/06
  See application file for complete search history.

(56) References Cited

U.S. PATENT DOCUMENTS

| 4,511,675 A | * | 4/1985 | Auerswald | ............... B01J 49/09 |
| | | | | 423/545 |
| 9,714,179 B2 | * | 7/2017 | Qian | ...................... C23F 15/00 |
| 2014/0290247 A1 | * | 10/2014 | Mishima | ............... B01D 3/065 |
| | | | | 60/641.9 |

FOREIGN PATENT DOCUMENTS

| WO | WO-2005105255 A1 | * | 11/2005 | ............... B01D 1/26 |
| WO | WO-2012052277 A1 | * | 4/2012 | ........... F01K 23/103 |

OTHER PUBLICATIONS

WO-2005105255-A1_English (Year: 2005).*

(Continued)

*Primary Examiner* — Youngsul Jeong
(74) *Attorney, Agent, or Firm* — John H. Choi & Associates

(57) ABSTRACT

A single-phase fluid (SPF) storage is introduced for desalination of high-salt water using thermal energy from a concentrated solar power (CSP) unit. The SPF having a specific volumetric enthalpy higher than that of water at critical point in the operating ranges from 20 to 300 bar in pressure and 190 to 400 C in temperature is used as a new type of thermal energy storage (TES) medium and heat transfer fluid (HTF). It produces wet steam of a quality required by the desalination unit generating both steam for utilization of latent heat and condensate for sensible heat when its pressure is reduced to lower operating pressures. With a MED-TVC unit by using the steam as motive steam, the capacity of the CSP unit and SPF storage can be reduced as much as the energy recycled in the desalination unit.

17 Claims, 10 Drawing Sheets

(56) References Cited

OTHER PUBLICATIONS

Desalting Handbook for Planners, 3rd Edition, 2003, Desalting and Water Purification Research and Development Program Report No. 72, Bureau of Reclamation, United States Department of the Interior: Relevant pages; p. 58 (Table 4-1, Process characteristics of MED systems; maximum operating temperature, performance ratio); p. 67 (Table 4-3, Process characteristics of MSF systems; maximum operating temperature, performance ratio); p. 72 (Table 4-5, Process characteristics of VC systems; maximum operating temperature, performance ratio).

Md Tasbirul Islam, Nazmul Huda, A.B. Abdullah, R. Saidur, A comprehensive review of state-of-the-art concentrating solar power (CSP) technologies, current status and research trends, Renewable and Sustainable Energy Reviews, 91, 987-1018, 2018: Relevant pages; p. 992 (Table 1, Characteristics of CSP technologies; Capacity, Capital cost, Operation and maintenance cost, Operating temperature of solar field, Heat transfer fluid for PTC, LFR, SPT, SPD).

High Temperature Water Heating Systems, 2003, UFC 3-430-04FA, U.S. Army Corps of Engineers: Relevant pages; p. 2-3 (Table 2-1, Influence of Temperature Differentials on Selection of Pump Sizes for HWT Systems).

Doerte Laing, Carsten Bahl, Michael Fis, Mathias Hempel, Thomas Bauer, Mirko Meyer-Grunefeldt, Martin Eickoff, Combined Storage System Developments for Direct Steam Generation in Solar Thermal Power Plants, German Aerospace Center (DRL) and Ed. Zublin AG, Germany: Relevant pages; p. 2 (Fig. 2: Schematic layout of a sliding pressure steam accumulator.; Section 2.1. Steam accumulator).

A.R. Imre, U.K. Deiters. T. Kraska, and I. Tselj, The pseudocritical regions for supercritical water, Nuclear Engineering and Design, 252, 179-183, Nov. 2012: Relevant pages; p. 2 (from line 5 from the bottom of the page stating "On figure 1,"); p. 3 (to line 7 from the bottom of the page ending with "with different meanings."); p. 13 (Figure 1: Vapor pressure curve (solid line), critical point (black circle) and the supercritical region with the Widom zone of the water; stable phases are marked.).

Steam / Its Generation and Use, 42nd Edition, The Babcock & Wilcox Corporation, 2015 (Excerpted): Relevant pages; p. 3 (Table 1, Recommended Feed Water Limits; pH all-ferrous heaters and Oxygen ppm maximum for 9 different conditions of steam generation).

Sotens A. Kalogirou, solar Desalination system, Solar Energy Engmeenng, 2009, (Excerpted from Thermal Vapor Compression, Science Direct, www.sciencedirect.com): Relevant pages; p. 2 (line 18 from the top stating Thermal vapor systems are designed for projects where steam is available. The required pressure is between 2 and 10 bar, and due to the relatively high cost of the steam, a large number of evaporative condenser heat recovery effects are normally justified.).

* cited by examiner

Pressure Enthalpy Diagram For Water

Pressure Enthalpy Diagram For Water

Pressure Enthalpy Diagram For Water

SOLAR DESALINATION SYSTEM

CROSS-REFERENCE TO RELATED APPLICATION

This application claims priority to U.S. Provisional Application No. 62/938,993, titled "Solar Desalination System," filed on Nov. 22, 2019, which is incorporated by reference in its entirety.

FIELD OF INVENTION

The present invention is related to the method of production of fresh water by thermal desalination of high-salt groundwater using the thermal energy from a concentrated solar power (CSP) system without stoppage of operation during the night.

BACKGROUND OF THE INVENTION

Desalination of high-salt groundwater requires thermal desalination rather than membrane desalination because the latter does not work well due to clogging on the membrane surfaces by the film formed with organic and inorganic components in the high-salt water. Thermal desalination is not affected by the existence of the film forming components as much as the membrane units are. However, thermal desalination units must operate around-the-clock, and this requirement makes thermal energy storage (TES) mandatory for thermal desalination. In this invention, new types of TES and TES medium and heat transfer fluid (HTF) are introduced for this purpose.

Groundwater has been used for the human activities including for drinking, agricultural, and industrial purposes for a long time. Recently, rapid pace of agricultural contamination, industrialization, and urbanization has resulted in the exploitation and contamination of groundwater resources. Reverse osmosis (RO) and other membrane technologies have been tried for desalination of the groundwater containing natural organic matter and inorganic constituents in high concentration. However, they tend to form membrane fouling films being caused by dissolved inorganic ($BaSO_4$, $CaSO_4$, and $CaCO_3$) or organic (humic acids) compounds, collides (suspended particles), bacteria, or suspended solids. Also, they caused brine disposal problems due to the limited recovery of water. Now, a new approach is required to desalinate groundwater by using thermal desalination utilizing solar energy so that fresh water can be produced anywhere in the globe as far as the sunlight is available to generate enough heat.

For thermal desalination, mainly three types of technologies are available: multistage flash distillation (MFD), multiple effect distillation (MED), and vapor compression distillation (VCD). The VCD includes mechanical vapor compression (MVC) and thermal vapor compression (TVC). One advantage of the distillation is that it can utilize low-cost energy in the form of low pressure steam from turbines or other waste heat. The MFD and MED distillation units can produce fresh water up to 100,000 $m^3$/day. The single vapor compression distillation (VCD) unit has a capacity of 3,000 $m^3$/day or less, while the multiple effect distillation-thermal vapor compression (MED-TVC) unit has a capacity of 10,000 to 30,000 $m^3$/day. Also, the MFD unit has performance ratio of 3.44-4.3 Kg/MJ, and the MED unit and VCD units have performance ratio of 3.44-5.17 Kg/MJ. The top brine temperature (TBT) within the process for the MFD unit is 90.6° C. to 110° C., for the MED unit 71.7° C. to 110° C., and for the VCD unit 46.1° C. to 101.7° C.

In a MED unit, the low pressure steam from the utility plants generates water vapor from the brine feed in the first effect evaporator while the low pressure steam condenses and the condensate is sent to the steam generation system. The water vapor produced in the first effect evaporator generates water vapor in the second evaporator from the brine feed while the water vapor from the first effect condenses as product distillate. The water vapor produced in the second effect evaporator generates water vapor in the third effect evaporator from the brine feed while the water vapor from the second effect condenses as product distillate. The water vapor produced in the third effect evaporator generates water vapor in the fourth effect evaporator from the brine feed. This sequence operation normally continues for 2 to 14 effects. The distillate streams from the second to the final effect collect and are produced as product fresh water. The brine concentrate in the amount of the difference between the brine feed and the fresh water is sent to the disposal.

In the multiple effect distillation-thermal vapor compression (MED-TVC) unit, a portion of the water vapor from the last effect of MED unit recycles for thermal energy recovery by using a steam jet ejector. The water vapor under vacuum is pulled into the suction of the steam jet ejector using the steam at pressures of 2 bar (absolute) to 30 bar as motive steam to generate discharge steam mixture at pressures less than 2 bar (absolute). The recycling thermal energy contained in the water vapor increases thermal efficiency for the MED-TVC unit. The discharge steam mixture from the steam jet ejector is the energy source for the MED-TVC unit. This discharge steam mixture condenses in the first effect evaporator, and then the condensate water of the discharge steam mixture is sent to condensate storage tank for steam generation.

In a MFD unit, the preheated brine feed is heated by the low pressure steam from the utility plant in the heating section, and the heated brine feed fed into the first stage which flows to the last stage. The hot brine feed flashes into the vapor space, and the flash water vapor condenses as product fresh water on the pipe surfaces in heat exchange with the incoming cold brine feed in each stage. While the hot brine stream progresses more than 20 stages, the pressure and temperature of the stages are continuously decreasing in order to promote flashing more effectively. The distillate streams from the first to the final stage collect and are produced as product fresh water. The brine concentrate in an amount of the difference between the total brine feed and the sum of the distillate is sent to the waste for disposal. As for the MFD-TVC unit, it has not been commercially used in the desalination industry.

In a TVC unit, the discharge steam mixture from the steam jet ejector is fed to the main heat exchanger where the preheated hot brine feed vaporizes in heat exchange with the condensing discharge steam mixture. The water vapor portion of the brine feed is pulled in total to the suction of the steam jet ejector, and mixed with the motive steam to form the discharge steam mixture which is fed again to the main heat exchanger to vaporize the incoming hot brine feed. The motive steam is in a pressure between 2 (absolute) to 10 bar. The liquid portion of the brine feed is discharged as brine concentrate after it is cooled in heat exchange with incoming cold brine feed stream. The condensate of the discharge steam mixture is also cooled in heat exchange with the incoming cold brine feed stream, and collects in the condensate storage tank. As a result, the incoming cold brine feed stream is preheated in heat exchange with the brine concentrate stream and also with the condensate stream of the discharge steam mixture at the same time. The condensate of the motive steam for TVC unit must be in a compatible quality with the product distillate. Otherwise, a steam transformer is mandatory in order to produce compatible motive steam in heat exchange with the steam from the utility plant. The product distillate in an amount of the water vapor portion of the brine feed is withdrawn from the condensate storage tank. A TVC unit produces up to 3000 m$^3$/day of fresh water.

For a CSP system as a thermal energy supplier for thermal desalination, four types of CSP technologies are available; linear Fresnel reflectors (LFR), parabolic trough (PT), parabolic dish (PD), and solar power tower (SPT). Generally speaking, LFR is capable of generating thermal energy at temperatures from 250° C. to 390° C. with power of 10 to 200 MW, PT from 290° C. to 550° C. with power of 10 to 200 MW, PD at around 800° C. with power of 1 to 40 KW, and SPT from 250° C. to 650° C. with power of 10 to 150 MW. Therefore, all four systems are capable of generating solar energy as a heat source for desalination unit for the required temperature level of around 130° C. For a desalination unit to operate during the night, however, no cheap thermal storage is available at the present time to produce fresh water in combination with the CSP units.

For thermal desalination units, low pressure steam is required to heat the high-salt water in the process at operating temperatures below 110° C. In the LFR unit, for example, it can heat a heat transfer fluid (HTF) up to 250-390° C. There are three options available in the market for the material to be used as a TES medium and HTF for LFR; thermal oil, solar salt, and water. For thermal oil, the highest temperature that it can be used at is 380° C. with a safety allowance of 20° C., as it starts to disintegrate from 400° C. The lowest temperature it can be used at is 20° C., because it freezes at 12° C. For solar salt, it can be used up to about 575° C., because it starts to disintegrate from 600° C. The lowest temperature it can be used is 270° C. when a safety allowance of around 50° C. is allowed to its freezing temperature of 222° C.

For water as an option for TES medium and HTF, it has been used in liquid state or vapor state. As in liquid state, High Temperature Water Systems were used to supply thermal energy at up to 200° C. utilizing sensible heat of water as a TES medium and THF. The average volumetric heat content is about 200 MJ/m$^3$ with a temperature differential of 50° C. for sensible heat transfer. As an example for a comparison, the thermal oil has a volumetric heat content of 475.9 MJ/m$^3$, and the solar salt of 342.5 MJ/m$^3$ for this application. The high temperature water systems are used for applications where low temperature heating is needed such as for domestic space heating, heat supply for buildings, and low temperature process heating. In addition, the systems usually require large storage volume due to the low volumetric heat content. As in vapor state, Steam Accumulators were tried at pressures up to 45 bar by generating steam as a HTF from a pool of hot water as a TES medium with a storage service time of about 50 minutes. In combination with CSP units, the steam accumulators have been tried to test its feasibility for energy storage against clouds during solar energy collection in the daytime. The major bottleneck in this approach is that the cost of the storage vessels is too expensive to justify with the amount of utilizable thermal energy by using this system. In summary, water and steam have shown poor performance as a TES medium so far, even though they have been used as an excellent HTF throughout the human history.

The thermal energy harvested by a LFR is used to generate steam by two options: firstly, the heat transfer by heat exchangers and secondly, the direct steam generation (DSG) in the receiver of the CSP unit. As for the steam generation by heat exchangers, steam is generated in heat exchange with the HTF from the LFR mainly at subcritical conditions. In this case, it requires large heat transfer area causing investment cost to increase. As for the DSG, water is fed to the solar field and directly evaporated and superheated in the receivers. In this case, the receiver tubes must sustain the steam pressure. For generation of high pressure steam, the LFR is especially advantageous because its design of the fixed absorber tubes with rotating reflectors for tracking makes it easier to design for operation at high pressures unlike the design of the parabolic trough which has moving absorber tubes and moving reflectors for tracking. In addition, the LFR is the cheapest option among the CSP technologies in terms of the installation and the operation and maintenance (O & M) costs. This is why the LFR has been chosen as an example for the CSP technologies in the present description of the invention.

The PT is one of the CSP technologies the most widely used in the utility industry. It can generate thermal energy at 290° C. to 550° C. with power of 10-200 MW. It can heat a TES medium and HTF stream up to 550° C. at the saturation pressure of the HTF, which in turn generate high pressure steam in heat exchange with the steam condensate feed water. At this operating temperature, solar salt is used as a HTF and TES medium. Also, a thermal storage can store and discharge the solar salt liquid between 270 to 550° C. In order to reduce the investment cost of the heat exchangers for steam generation, direct steam generation (DSG) is tried recently. Steam at pressures up to 100 bar was generated, but supercritical water above 221 bar has not been tried. This could be due to the fact that PT requires flexible joints owing to its tracking system design causing difficulties for operation above supercritical pressure and temperature of water.

The SPT is one of the CSP technologies the most widely used in power industry. It generates thermal energy at 250° C. to 650° C. with power of 10 to 150 MW. It can heat a TES medium and HTF stream at saturation pressure of the HTF at temperatures up to 650° C., which in turn can generate high pressure steam in heat exchange with steam condensate feed water. At this operating temperature, solar salt is used as a TES medium and HTF. The solar salt, however, can be used up to 575° C., because it starts to disintegrate from 600° C. Also, a thermal storage can be used by storing and discharging the solar salt liquid between 270 to 575° C. In order to reduce the high investment cost caused by the heat exchangers for steam generation, direct steam generation (DSG) was recently tried at subcritical pressures in utility plants. Superheated steam at pressure up to 170 bar and temperature up to 550° C. has been generated, and electricity generated successfully for many years. The SPT is however very expensive option among the CSP technologies.

The PD has been known as a solar energy collector for a long time. It collects thermal energy at around 800° C. with power of 1-40 KW. For PD, with the current designs available, the working temperature is too high and also thermal capacity too low for production of fresh water at high production rates. However, it is still a very promising CSP technology for low capacity desalination systems.

Supercritical steam is generated by once-through vaporization in coal fired boilers without a boiler recycle drum.

Since no liquid phase exists, the surfaces contacting the supercritical steam cannot be cleaned with liquid water. The possible deposits will cause corrosion. In order to prevent such deposits from forming, two methods the condensate polishing and the oxygenated water treatment (OWT) are used in combination. In order to keep the feed water clean, the condensate feed water is demineralized by condensate polishing using ion exchange resins. Normally, the total dissolved solids (TDS) for the condensate feed water of supercritical steam, for example, must be 0.5 mg/l at the maximum, while the fresh water from the desalination units has TDS from 25 to 50 mg/l.

For the once-through boilers producing supercritical steam in coal fired boilers, the oxygenated water treatment (OWT) is proved to be very effective in controlling corrosion by keeping the surfaces contacting supercritical steam clean. During operation, the oxygen content in the condensate feed water is maintained at 30 to 150 ppb by oxygen injection, the pH at 8 to 8.5 by ammonia (NH3) injection, and the cation conductivity at less than 0.15 µs/cm by the condensate polishing as explained above. The oxygen in the supercritical steam oxidizes the substrate surfaces producing hematite ($Fe_2O_3$) scale which will restrict diffusion of oxygen to the substrate and the outward diffusion of iron resulting in a thinner, more stable scale with a smoother surface. The oxygen in the supercritical steam is a very strong oxidizing agent.

For thermal desalination of high-salt groundwater, LFR is the cheapest option among the CSP technologies available, and chosen as an example for CSP technologies in this description. MED-TVC consumes the least amount of thermal energy among the desalination technologies available. Superheated steam at subcritical pressures was recently generated by DSG in CSP units. However, supercritical steam is rarely generated in commercial CSP units, even though it has been produced by once-through vaporization in coal-fired boilers. For TES, a new medium having low investment cost, operation and maintenance (0 & M) cost, and low freezing point is introduced in this invention as a TES medium and HTF along with a new type of solar thermal energy storage.

BRIEF SUMMARY OF THE INVENTION

In this invention, the water in single-phase in the pressurized liquid water region and in the supercritical water region is used as a TES medium and HTF. This water is defined as the single-phase fluid (SPF) which is heated in single-phase through a pressurized liquid water region until the temperature reaches the critical temperature of water at 374° C. and then through a supercritical water region above 374° C. wherein the specific volumetric enthalpy of said SPF at the operating conditions is higher than that of water at critical point at 671.1 MJ/m³. The SPF is used as a TES medium and HTF for the solar desalination system by generating both steam for utilization of latent heat and steam condensate for sensible heat. The SPF is produced in a CSP unit, supplied to the desalination unit for operation, and at the same time stored in the storage tanks during the daytime. The SPF is then discharged in the night to operate the desalination unit. The SPF generates steam and condensate upon depressurization into the vapor-liquid two phase region of water for use in the process.

When the SPF is generated, the water is pressurized and heated at the optimum pressure and temperature between around 20 bar and 300 bar in pressure and between around 190° C. and 400° C. in temperature, where the required steam quality can be attained when the SPF undergoes an isenthalpic expansion into the vapor-liquid region to the lower operating pressures for the desalination unit. The optimum means the lowest in cost while achieving the goal safely. Therefore, the steam quality at the operating pressure of the desalination process determines the pressure and temperature for the SPF to be generated at in the CSP unit. For example, in the case when a steam quality of 32% is needed at 30 bar in the process, the SPF can be heated to 337° C. at 190 bar, which is in the region of pressurized liquid water and will produce 32% steam when its pressure is reduced to 30 bar by an isenthalpic expansion. In the case when a steam quality of 52% is needed at 30 bar, on the other hand, the SPF can be heated to 380° C. at 250 bar, which is in the region of supercritical water and will produce 52% steam when its pressure is reduced to 30 bar by an isenthalpic expansion. At this pressure, an isentropic expander for electricity generation can be operated using this steam. Also, a steam jet ejector can be operated using this steam as motive steam for recycling the water vapor from the desalination unit. Once produced at the required pressure and temperature, the SPF is stored in the storage tanks for use in the night.

For desalination of high-salt groundwater, the desalination unit must operate in wider operating conditions compared to the seawater desalination. With MED-TVC, for example, the unit needs to process both the fresh brine feed of high-salt groundwater and also the brine concentrate feed to reduce liquid volume by concentrating it further. For the fresh brine feed of high-salt groundwater, the MED-TVC unit will need to operate at temperatures below 70° C. to prevent precipitation of CaSO4, even though it operates for seawater at 70° C. As the solubility of CaSO4 in water increases while the solution temperature decreases, the ground water containing salts in higher concentrations than seawater must operate at lower temperatures for safety. When the brine concentrate is processed to concentrate it further, the MED-TVC unit must operate at higher temperatures and higher vacuum in order to compensate the boiling point elevation due to the higher concentration of salts, probably to 110° C. or higher which will be the maximum operating temperature for seawater with additives for scale control. The operation for the brine concentrate at higher process temperatures and vacuum will need more steam than the operation for fresh brine. The solar desalination system, therefore, must be able to accommodate those process requirements.

An advantage of generating the SPF in single-phase is that the once-through generation can avoid the phase segregation that would occur when liquid water vaporizes into steam in the two phase region below the critical pressure. However, when the water is heated in single-phase through the pressurized liquid water phase region and then through the supercritical water phase region, the SPF passes through the single-phase regions with no segregation of phases that would otherwise cause uneven heat transfer.

The SPF can be expanded to the lower pressures by two options: an isentropic or an isenthalpic process. The isentropic option allows the SPF to expand in a nearly isentropic process through the single-phase region and then continuously through the two phase region of vapor-liquid until the expanding steam reaches the pressure of the low pressure steam that is desired for the desalination process. The expansion of the steam is achieved by an isentropic expander while producing electricity. When the desired pressure is reached with electricity generation, the low pressure steam is used as a heating medium for the desalination unit. The low pressure wet steam at this state has an enthalpy reduced by the amount used to produce the electricity. The low pressure steam above 2 bar (absolute) can be also used as motive steam for steam jet ejectors in MED-TVC and TVC units.

The isenthalpic option allows the SPF to expand in a nearly isenthalpic process by using an expansion valve through the single-phase region and then continuously through the two phase region of vapor-liquid until the steam reaches the pressure of the low pressure steam that is desired by the desalination unit. The low pressure steam is used to heat the brine in the desalination unit. The enthalpy of the steam in this case does not change during the isenthalpic expansion. In this case, the low pressure steam above 2 bar (absolute) can be used as motive steam for steam jet ejectors in MED-TVC and TVC units.

In the case when electricity is generated by using the steam from the SPF through the two phase region of water, the existence of condensate liquid makes it difficult to use high speed turbines. Some specially designed expanders for this situation require low axial speed, low operating pressure, and a low pressure drop between the inlet and outlet of the expander. In this case, a pressure reduction valve or isenthalpic expander will be needed in front of the isentropic expanding machine.

The SPF can be used as a TES medium and HTF, since its volumetric heat content is higher than that of the competing materials. The SPF has a volumetric heat content of 626.3 MJ/m$^3$ at 380° C. and 250 bar with a freezing point of 0° C. when it is used between the storage condition of 380° C. and 250 bar and the datum point at saturated liquid condition of 130° C. and 2.7 bar. On the other hand, the thermal oil has a volumetric heat content of 475.9 MJ/m$^3$ with a freezing point of 15° C. when it is used between the temperature of 380° C. and 130° C. Therefore, the option of thermal oil with LFR is about 24% lower in heat storage capacity than the SPF. In this case, it is assumed that a LFR is employed as a CSP unit, since it generates heat at temperatures up to 390° C., which is high enough for this application with its installation cost being the lowest among the CSP technologies. However, the thermal oil starts to disintegrate from 400° C. and cannot be used above this temperature, wherein the steam is thermally stable at these temperatures. Therefore, the SPF is superior to the thermal oil as a TES medium and HTF for the solar desalination system.

Solar salt in the form of a eutectic mixture of $KNO_3$ and $NaNO_3$ can be used as a TES medium and HTF employing a LFR as a CSP unit. The LFR can generate heat up to 390° C., even though the solar salt can be used up to a temperature near 600° C. where it starts to disintegrate. In this case, the volumetric heat content of solar salt between 390° C. and 270° C. is 342.5 MJ/m$^3$ when a safety margin of about 50° C. is allowed from the freezing point of 222° C. of the solar salt. Comparing this result with 626.3 MJ/m$^3$ previously evaluated for SPF, the option of solar salt with LFR is about 45% lower in heat storage capacity than the SPF. Therefore, the SPF is still superior to the solar salt as a TES medium and HTF for this application.

By using the SPF as a source of the motive steam in a pressure range from the critical pressure of water to 2 bar (absolute), a MED-TVC unit can operate at higher performance ratio (PR) with a steam jet ejector. The MED-TVC can recycle the heat of vaporization contained in the water vapor generated in the last effect of the desalination unit. The goal of this invention is to recycle 20% to 40% of this water vapor. Owing to the heat recovery by the water vapor recycling through the steam jet ejector, a MED unit having a performance ratio (PR) of 9 will achieve a PR of about 11 to 15 by addition of a steam jet ejector with the water vapor recycling of 20% to 40%, respectively. The water vapor recycling enables reduction of the capacity of the CSP and TES units as much as the energy saved by the water vapor recycling while reducing the price of the product fresh water by 14% to 28%, respectively. For a TVC unit, on the other hand, the condensate of SPF is in better quality than the distillate. This advantage makes the design of the TVC unit so simple with no steam transformer needed. By combining with the CSP unit and the TES of SPF, it can produce fresh water from the high-salt groundwater at reasonable investment and O&M costs. The TVC can reduce the capacity of the CSP unit and SPF storage system as much as the thermal energy being recovered from the streams of the exit brine concentrate and the condensate of the discharge steam mixture based on the new steam prices derived from the solar energy. Since a TVC unit can produce fresh water up to 3000 m$^3$/day, which can support about 3000 families, it will provide invaluable opportunities to supply drinking water from the high-salt groundwater in remote arid areas.

The comparison shows that the SPF is the most competitive as a TES medium and HTF with LFR as a CSP unit for this application. The SPF storage system comprises a plurality of storage tanks. This SPF storage stores the SPF in the fullest extent and discharges in full, while the stored thermal energy can be recovered in the form of electricity and the low pressure steam for use either as heating medium or motive steam for steam jet ejectors in desalination units. It can also generate high pressure steam as a motive steam for steam jet ejectors, and steam condensate as a heating medium. The price of solar salt is about $2,000/m$^3$ and of thermal oil $25,000/m$^3$, while that of water lower than $5/m$^3$. Accordingly, the SPF is more advantageous in this application compared to the thermal oil and solar salt. The low pressure steam from the electric generator and the steam condensate are used as a heating medium until the condensate temperature reaches 130° C. for desalination unit. The low pressure steam above 2 bar (absolute) can be also used as motive steam for steam jet ejectors in MED-TVC and TVC units. Since this SPF storage allows the desalination unit to recover thermal energy from the steam condensate, its thermal recovery efficiency is much higher than High Temperature Water Systems which have an average volumetric heat content of about 200 MJ/m$^3$ with a temperature differential of 50° C. for sensible heat transfer or the Steam Accumulators which recover flash steam from the stagnant pool of hot water at pressures up to 45 bar with a thermal storage capacity of 50 minutes. The SPF makes the storage system the most competitive in overall investment cost.

BRIEF DESCRIPTION OF THE DRAWINGS

The foregoing summary, as well as the following detailed description of presently preferred embodiments, will be better understood when read in conjunction with the appended drawings. For the purpose of illustrating the embodiments, there are shown in the drawings embodiments which are presently preferred. It should be understood, however, that the embodiments are not limited to the precise arrangements and instrumentalities shown.

DETAILED DESCRIPTION OF THE INVENTION

Figure 1:
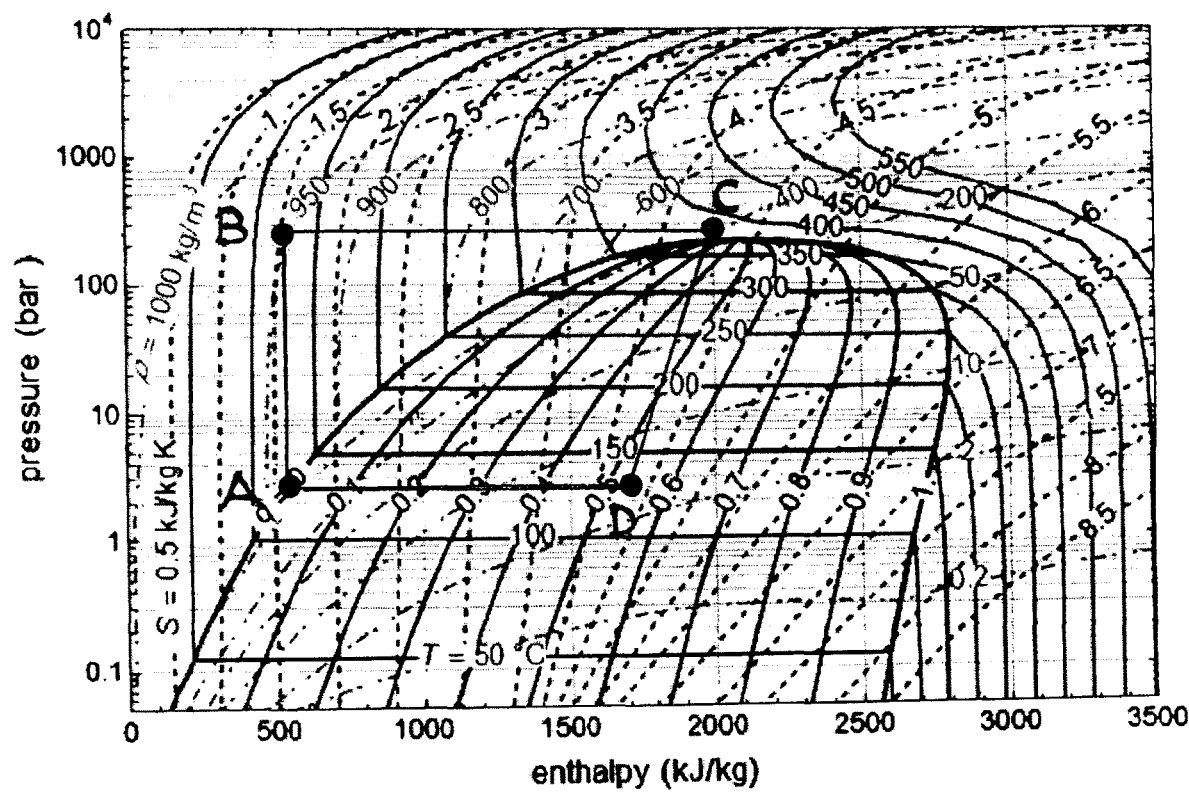
FIG. 1 is a pressure enthalpy diagram for water with isentropic expansion of single-phase fluid (SPF)

The solar desalination system of this invention treats high-salt groundwater using solar energy from CSP units. Unlike the seawater having TDS of 35,000 mg/liter on average, the groundwater can have TDS of more than 50,000 mg/liter. The contaminants in the high-salt water make fouling on the membrane surfaces in membrane desalination or deposits on the heat transfer surfaces in thermal desalination. However, it is easier to control the precipitation in thermal desalination, so the thermal desalination is preferred to the membrane desalination in this application. In order to combine desalination with solar energy in more efficient way, two major technical solutions must be provided. They are firstly the need for the more efficient thermal energy storage (TES) system for this application and secondly for the substance to be used as a TES medium and HTF. They must be low in investment and also in operation and maintenance (O&M) costs. The embodiments in this invention have been devised for those two needs.

For the TES, the embodiment of this invention uses a plurality of carbon steel tanks. The tanks store thermally charged single-phase fluid (SPF) at the storage conditions between 20 bar and 300 bar in pressure and between 190° C. and 400° C. in temperature during the daytime. The tanks can be constructed of low chrome carbon steel for the service at 250 bar and 380° C. The TES can hold thermal energy for 16 hours so that the thermal desalination units can operate continuously during the night.

The single-phase fluid (SPF) is produced from water, and used as a TES medium and HTF utilizing both steam for latent heat and condensate for sensible heat. The SPF at pressures from 20 bar to 300 bar is a pressurized liquid water until the temperature reaches the critical temperature of water and a supercritical water after the temperature exceeds the critical temperature. The SPF is pressurized and heated to the optimum pressure and temperature at which the quality of steam required by the desalination unit can be attained when the pressure of said SPF is reduced to the operating pressure by isenthalpic expansion. The optimum means the lowest in cost while achieving the goal safely. The specific volumetric enthalpy of the SPF at the operating conditions is higher than that of water at critical point at 671.1 MJ/m$^3$. In this description of the invention, it is described in detail how the four components of the solar desalination system a CSP, a SPF, a TES, and a thermal desalting unit are working in combination to achieve the most efficient treatment of high-salt groundwater.

The groundwater contains inorganic compounds making deposits on the heat transfer equipment surfaces contacting the brine. For CaSO4 one of the major inorganic components, for example, its solubility in water increases while solution temperature decreases. Therefore, even for seawater, MED operates at around 70° C. much lower than the precipitation temperature of CaSO4 in seawater at 115° C., while the maximum operating temperature is 110° C. being close to the precipitation temperature of CaSO4 with additives to prevent precipitation of the salt. When the fresh brine feed of high-salt water is to be desalinated, therefore, the desalination unit must operate at temperatures lower than 70 C, because the high-salt water must contain CaSO4 at higher concentrations than seawater. When it is desired to reduce the volume of the concentrate brine liquid further, the desalination unit must operate at higher temperatures due to the boiling point elevation by the increased concentration of salts. Therefore, the desalination unit for high-salt groundwater must be provided with options to operate in wider temperature ranges from the temperatures below 70° C. to higher than 110° C. under higher vacuum. In this case, the steam at pressures from 2 bar (absolute) to 30 bar must be available for steam jet ejectors as motive steam to compress the recycling water vapor for latent heat recovery for higher operating temperatures and also to evacuate the desalination unit for higher vacuum. For MFD, the desalination unit operates mainly at 90.6° C. for seawater, even though it can operate at temperatures up to 110° C. At 110° C., the first 3 to 6 stages must be lined or clad with 316 L stainless steel.

Figure 5:
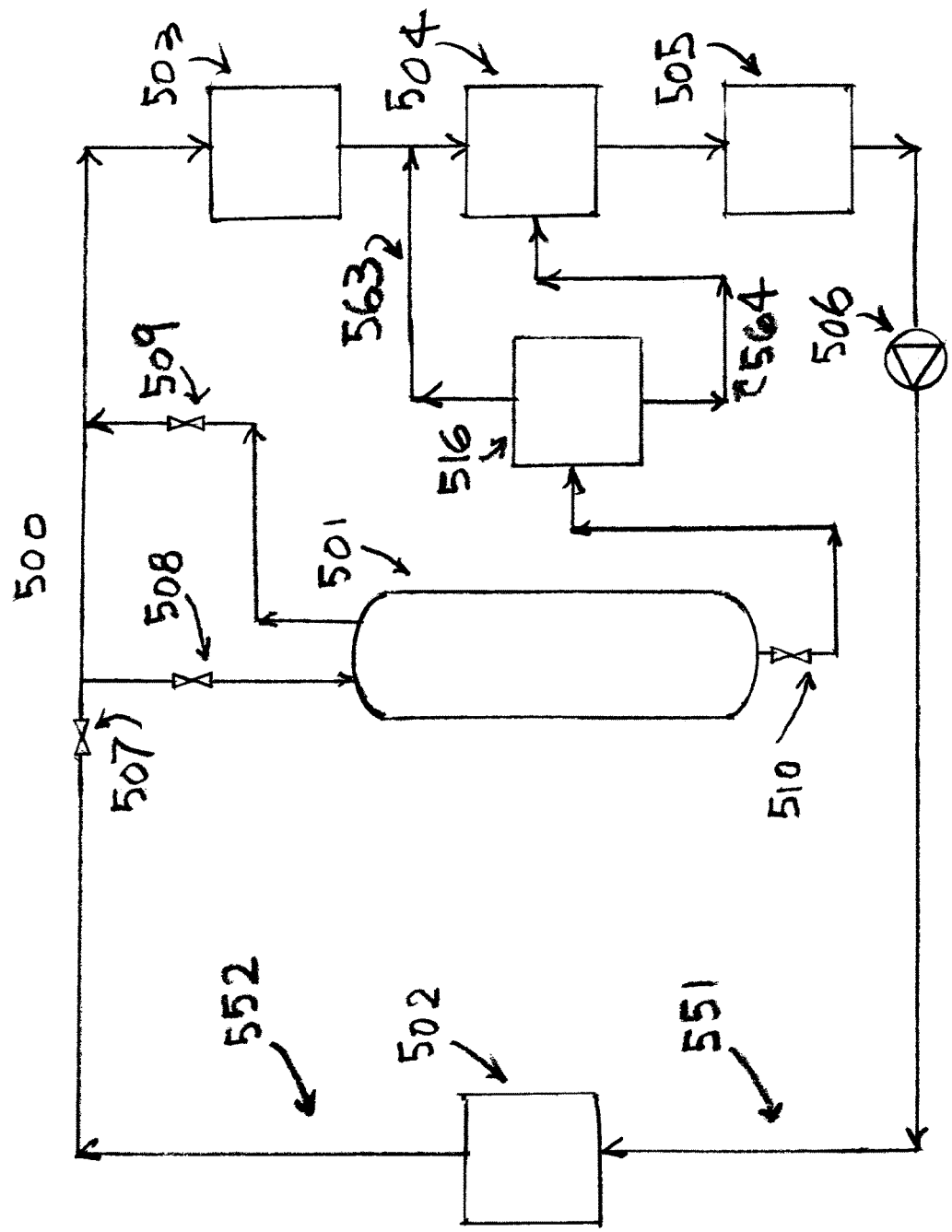
FIG. 5 is a schematic diagram of an embodiment of a solar desalination system of the present invention with isentropic expansion of single-phase fluid (SPF)
Figure 6:
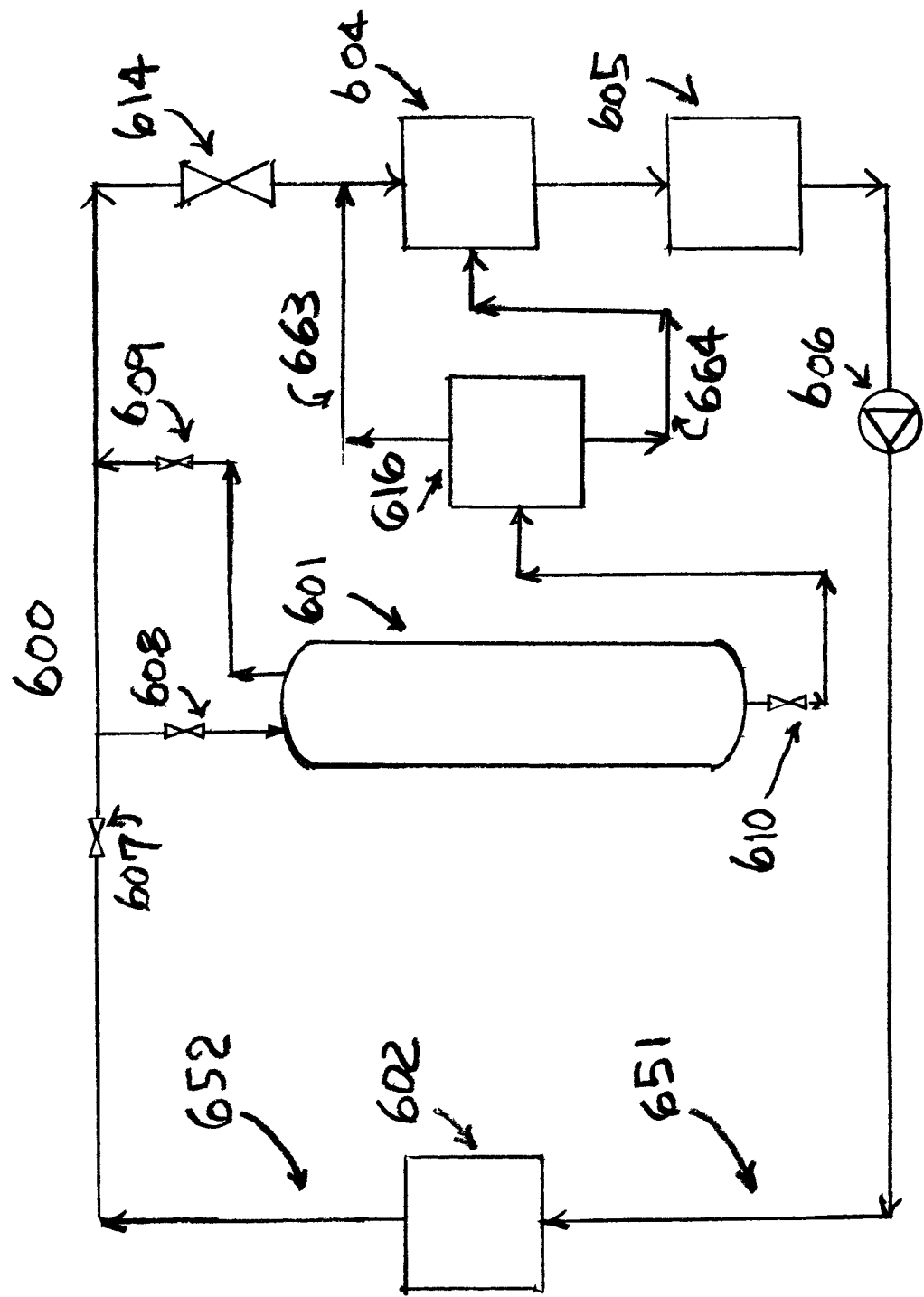
FIG. 6 is a schematic diagram of another embodiment of a solar desalination system of the present invention with isenthalpic expansion of single-phase fluid (SPF)

In embodiments shown in FIGS. 5 and 6, the solar desalination systems (SDS) 500 and 600 of this invention comprise a concentrated solar power (CSP) unit, a single-phase fluid (SPF) storage, a condensate flash tank, a thermal desalination unit, a steam condensate water storage, and a pump to pressurize the condensate water of SPF to the storage pressure in common. As for the SPF expander, it is for isentropic expansion in FIG. 5 and for isenthalpic expansion in FIG. 6. The SDS 500 and 600 produce fresh water from high-salt water by using solar energy from the CSP unit. Since the SDS must operate without stoppage in order to keep the system warm in the night, a thermal energy storage (TES) to save heat during the daytime is necessary so that the thermal energy for desalination unit can be supplied during the night. In addition, the storage technology of thermal energy must be as low as possible in investment cost. Even though there are some energy storage technologies available at the present time to generate electricity during the night, they are mostly too expensive to use for the desalination unit producing fresh water.

The TES of this invention stores SPF in a tank during the daytime, and discharges the SPF in the night to operate the desalination unit. When used in the night, the SPF is expanded to the desired pressure in the two phase region for the desalination unit. The desalination unit requires low pressure steam to heat the brine feed at temperatures of 110° C. at the maximum. Therefore, the SPF is expanded to the desired pressure for the steam temperature of around 130° C. with a temperature difference of 20° C. being allowed for heat transfer in heat exchangers for heat recovery from steam as well as the steam condensate. The SPF expands by using an expander, which operates an isentropic or isenthalpic process.

As an example, a SPF having a specific volumetric enthalpy of 872.6 MJ/m$^3$ at 380° C. and 250 bar is used as a TES medium and HTF. As shown in FIG. 1, the condensate water of the SPF at point A at 130° C. and 2.7 bar is pumped to a supercritical pressure of 250 bar in a nearly isothermal process while neglecting the enthalpy increase by pumping, which would cause a temperature rise of around 8° C. in a completely adiabatic condition. Then, the high pressure water in the pressurized liquid water region at point B at 130° C. and 250 bar is heated to 380° C. at point C in supercritical water region, and then the SPF at point C at 380° C. and 250 bar with a specific volumetric enthalpy of 872.6 MJ/m$^3$ is expanded in an electric generator to generate low pressure steam at point D at 130° C. and 2.7 bar. The wet low pressure steam is then used to heat the feed brine to a temperature of 110° C. at the maximum through a heat exchanger in the desalination unit, and then the saturated condensate water at point A recirculates again. At the end of the isentropic expansion in this steady-flow process, the steam quality at 130° C. and 2.7 bar is about 47% with 45% of the available enthalpy of the stored SPF having been used for electricity generation and 55% of the initial enthalpy still being available for desalination. The steam condensate from the condensate flash tank is sent to the desalination unit for heat recovery.

The thermally charged SPF at 380° C. and 250 bar at point C in FIG. 1 is also saved in the SPF storage tank during the daytime. During the charging process, the pressure of the storage tank rises from that of the empty tank to that of the SPF. The condensate formed during the charging process is removed to the condensate flash tank, and then the flash steam and condensate are sent to the desalination unit for heat recovery. The additional fresh SPF at 380° C. and 250 Bar in the amount of the thermal energy contained in the removed condensate will be charged to the storage tank. Unlike the daytime process explained above, this charging process is not a steady flow because the storage tank blocks the SPF flow.

During the night, the SPF from the storage tank is discharged, which expands in an expander in a nearly isentropic process, and reaches the required pressure of 2.7 bar at 130° C., which is the required pressure, and consequentially the required temperature for the desalination unit. The pressure of the storage tank decreases continuously to the empty tank pressure. The condensate formed during the discharging process is removed and sent to the condensate flash tank, and then the flash steam and condensate are fed to the desalination unit for heat recovery. Since the point C and point A in FIG. 1 are definite as a state function having the enthalpy difference of 1389.4 kJ/kg, the available enthalpy can be used for the electricity generation and operation of the desalination unit. A state function is a thermodynamic property that does not depend on the path such as enthalpy and internal energy.

In a first embodiment, the schematic diagram of the solar desalination system 500 with isentropic expansion of SPF is shown in FIG. 5. In the daytime, the condensate water of the SPF is collected in condensate tank 505 at 130° C. and 2.7 bar, and then pumped to the pressure of 250 bar by pump 506. The pump discharge condensate water 551 is then heated to the temperature of 380° C. by a CSP unit 502 for stream 552. The SPF at 380° C. and 250 bar is used to run an expander 503 generating electricity and to operate the desalination unit 504. The condensate water of the SPF after desalination unit collects in condensate tank 505.

At the same time, the SPF at 380° C. and 250 bar with a volumetric heat content of 626.3 MJ/m$^3$ is stored in SPF storage tank 501. For charging, valve 507 and valve 508 are opened with valve 509 and valve 510 closed. Valve 510 is opened when steam condensate is removed from the storage tank 501 and sent to condensate flash tank 516. Flash steam 563 and steam condensate 564 from condensate flash tank 516 are sent to desalination unit 504 for heat recovery during charging in the daytime. In the night, valves 507 and 508 are closed and valve 509 is opened. The stored SPF is discharged to run the expander 503 and to operate the desalination unit 504. At this time, valve 510 is opened when steam condensate is removed from the storage tank 501 and sent to condensate flash tank 516. Flash steam 563 and steam condensate 564 from condensate flash tank 516 are sent to desalination unit 504 for heat recovery during discharging in the night. The condensate after desalination collects and is stored in the condensate tank 505.

When the SPF stored in the storage tank 501 is discharged for use in the night, the pressure of the storage tank 501 decreases. When the storage tank pressure decreases from 250 bar to 100 bar, about 90% of the initial amount of the SPF will have been used, and when the storage pressure decreases to 10 Bar, 99% of the initial amount of the SPF used. The empty SPF storage tank 501 must be maintained at the storage temperature of 380° C. by using steam jackets or electric tracing so that the new batch of SPF at 380° C. and 250 bar can be received the next day without interruption.

Figure 2:
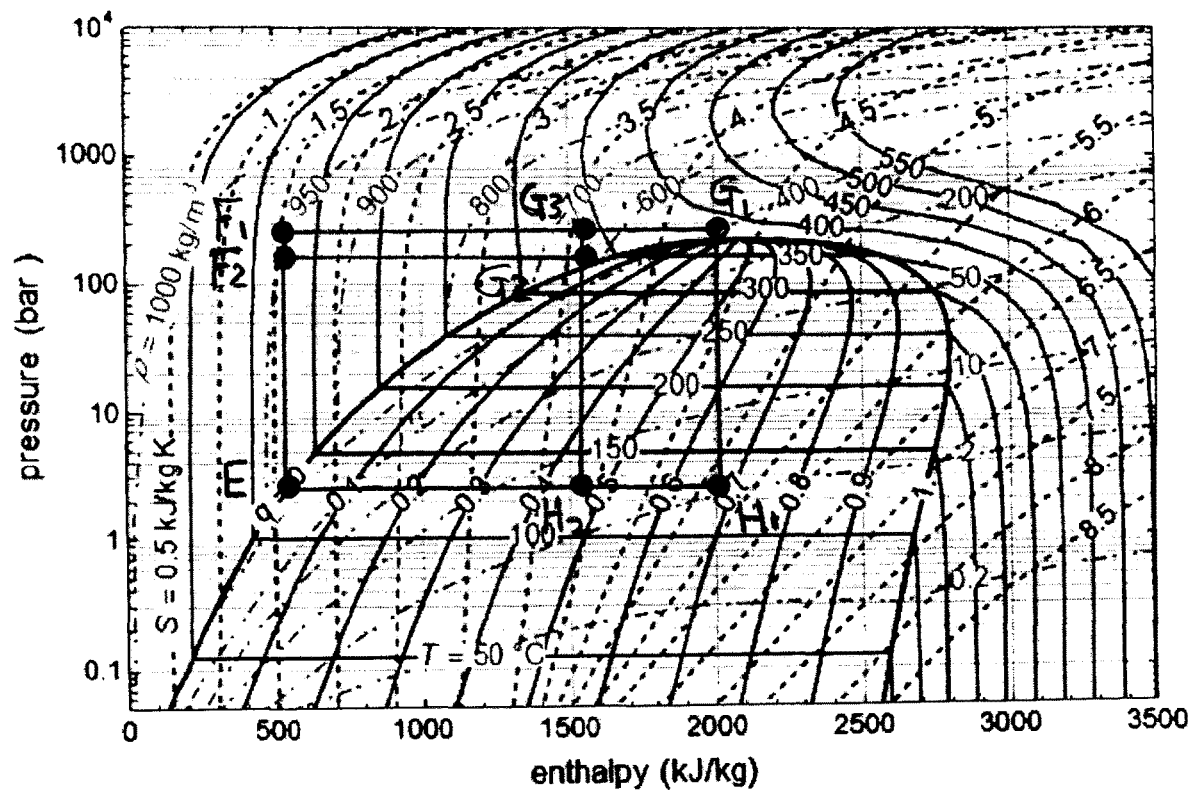
FIG. 2 is a pressure enthalpy diagram for water with isenthalpic expansion of single-phase fluid (SPF)

In FIG. 2 is shown the daytime operation of the solar desalination system 600 in FIG. 6 with isenthalpic expansion of SPF. In this scheme, the process between point G1 and point H1 and the process between point H1 and point E are different from the process between point C and point D and the process between point D and point A in the isentropic case shown in FIG. 1. Points E, F1, and G1 in FIG. 2 are identical to points A, B, and C in FIG. 1, respectively. The condensate water at point E at 130° C. and 2.7 bar is pumped to point F1 at a pressure of 250 bar. Then, the high pressure water in the pressurized liquid water region at point F1 at 130° C. and 250 bar is heated to 380° C., and then the SPF at point G1 at 380° C. and 250 bar expands in the nearly isenthalpic process to a pressure of 2.7 bar and 130° C. The low pressure steam at H1 at 130° C. and 2.7 bar has nearly the same enthalpy as the initial enthalpy at point G1. Now, the enthalpy difference of 1389.4 kJ/kg is available for a desalination unit in the process between point H1 and point E, whereas in the previous isentropic process 45% of the total enthalpy of 1389.4 kJ/kg was used for electricity generation and the remaining 55% used for the desalination unit.

The thermally charged SPF at 380° C. and 250 bar is saved during the daytime. During the charging process, pressure of the storage tank continuously rises from the empty tank pressure to the SPF pressure. The steam condensate formed is removed and sent to the condensate flash tank, and then the flash steam and steam condensate are sent to the desalination unit for heat recovery In the night, the SPF at 380° C. and 250 bar now expands in an isenthalpic process. The storage tank pressure decreases continuously from 250 bar to the empty tank pressure. The condensate formed is removed and sent to the condensate flash tank, and then the flash steam and condensate are sent to the desalination unit for heat recovery. Since point G1 and point E are definite as a state function with an enthalpy difference of 1389.4 kJ/kg, the enthalpy difference can be used in total for the operation of the desalination unit.

In a second embodiment, the schematic diagram of solar desalination system 600 with isenthalpic expansion of SPF is shown in FIG. 6. The difference between FIG. 5 and FIG. 6 is that the isentropic expander 503 is changed to an isenthalpic expanding valve 614 in FIG. 6. The components having reference numerals with the identical last two digits do the same function, respectively, as those in FIG. 5. In the daytime, the condensate water of the SPF is collected in condensate tank 605 at 130° C. and 2.7 bar, and then pumped to the pressure of 250 bar by pump 606. The pump discharge condensate water 651 is then heated to the temperature of 380° C. by a CSP unit 602 for stream 652. The SPF at 380° C. and 250 bar expands to the low pressure at 130° C. and 2.7 bar. The condensate formed during the isenthalpic expansion is sent to the condensate flash tank 616, and then flash steam 663 and steam condensate 664 are sent to the desalination unit for heat recovery. The low pressure steam is then used to run a desalination unit 604. The condensate water of the SPF after the desalination unit collects in the condensate tank 605.

In the daytime, the SPF at 380° C. and 250 bar is also stored in a SPF storage tank 601. For charging, valve 607 and valve 608 are opened with valve 609 and valve 610 closed. During charging, steam condensate forms and is removed from the storage tank 601 to the condensate flash tank 616 by opening the valve 610, and flash steam 663 and steam condensate 664 are sent to desalination unit 604 for heat recovery. In the night when the storage tank 601 discharges the stored SPF, valves 607 and 608 are closed and valve 609 is opened. The stored SPF is discharged while expanding to the low pressure steam to operate the desalination unit 604. At this time, valve 610 is opened when steam condensate is removed from the storage tank 601 and sent to condensate flash tank 616. Flash steam 663 and steam condensate 664 from condensate flash tank 616 are sent to desalination unit 604 for heat recovery during discharging in the night The condensate from the desalination unit collects and is stored in the condensate tank 605.

In FIG. 2, another thermodynamic cycle comprising the states E, F1, G3, and H2 is shown. In the cycle, steam condensate at 130° C. and 2.7 bar at state E is pressurized to 250 bar at state F1, heated to 340° C. at constant pressure at state G3, expanded to 2.7 bar and 130° C. at state H2 generating wet steam having steam quality of 47%, and then the steam and condensate are used to operate the desalination unit. The condensate from the desalination unit at 2.7 bar and 130° C. is recirculated to the CSP unit.

In FIG. 2, another thermodynamic cycle comprising the states E, F2, G2, and H2 are shown. In this cycle, steam condensate at 2.7 bar and 130° C. at state E is pressurized to 190 bar at state F2, heated to 337° C. at state G2. This is the point where the state G3 would arrive by an isenthalpic expansion to 190 bar from 250 bar. Then, the SPF at 190 bar and 337° C. expands to 2.7 bar at 130° C. at state H2 producing wet steam of a quality of 47%. This cycle produces the same quality steam as in the previous cycle. In the previous cycle, the steam condensate is pressurized to a supercritical pressure at 250 bar and then heated to 340° C. in order to ensure that phase segregation does not take place for smooth heat transfer in single-phase. In this cycle, the steam condensate at 190 bar starts to form two phases of vapor-liquid from the saturation temperature of 361° C., so some measures must be provided to prevent the steam condensate stream from being over-heated over 337° C. For example, with a given amount of heat input in a CSP receiver, the outlet temperature of the SPF stream depends on its flow rate. Therefore, the over-heating can be prevented by providing a proper instrumentation such as a temperature controller with the flow rates being manipulated to achieve this goal. By operating at lower pressure at 190 bar, pumping power can be saved by an one quarter compared to the operation at 250 bar, minimizing parasitic power consumption.

Figure 3:
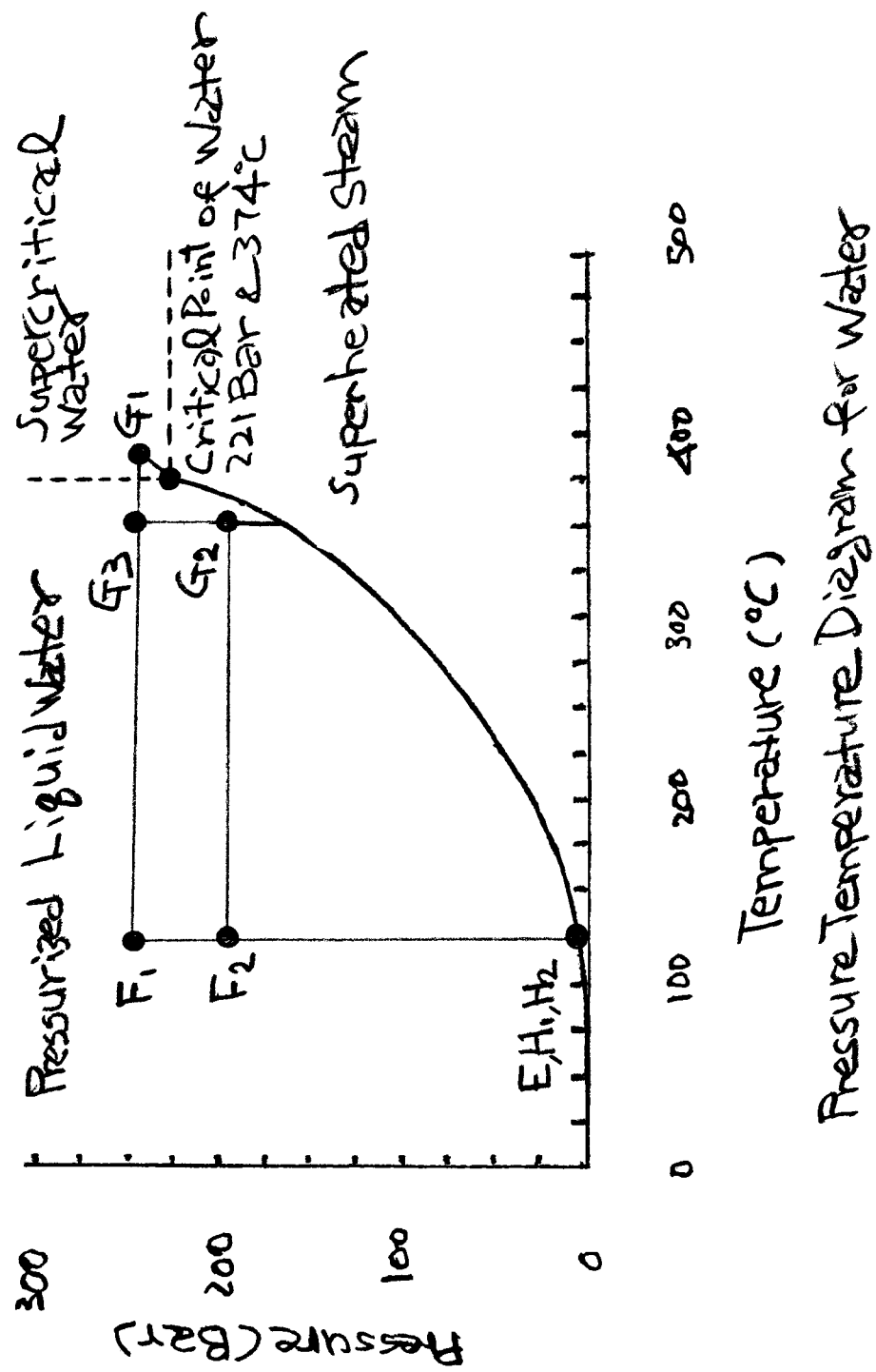
FIG. 3 is a pressure temperature diagram for water with isenthalpic expansion of single-phase fluid (SPF)

In FIG. 3 is shown the pressure temperature diagram of water for the thermodynamic states of the isenthalpic expansion process of SPF illustrated in FIG. 2 of the pressure enthalpy diagram. The alphabets indicating the states are identical for both diagrams. The condensate water at point E at 2.7 bar and 130° C. is pressurized by a pump to a pressure of 250 bar and 130° C. at point F1 above the critical pressure of water at 221 bar in the pressurized liquid water region, and then heated to 380° C. at point G1 above the critical temperature of water at 374° C. in the supercritical water region. During this heating process at 250 bar, the SPF is heated at constant pressure through a single-phase of the pressurized liquid water region and then to the temperature of 380° C. above the critical temperature of water at 374° C. through a single-phase of the supercritical water region. The SPF expands by an isenthalpic expansion until the wet steam reaches 2.7 bar and 130° C. at H1. At H1, the wet steam has a quality of about 64%. At point G1, the SPF is also stored in the SPF storage tank in the daytime, and then discharged in the night to operate the desalination unit.

Also shown in FIG. 3 is the case when the condensate water at point E at 2.7 bar and 130° C. is pressurized by a pump to a pressure of 190 bar and 130° C. at point F2 and heated until the temperature reaches 337° C. at point G2, instead of the previous case where the condensate water at point E is pressurized to 250 Bar and 130° C. and then heated to 340° C. at point G3. The SPF at 190 bar and 337° C. is in the pressurized liquid water region in single-phase, and can expand by an isenthalpic expansion process until the system pressure is reduced to 2.7 bar at 130° C. at H2. At H2, this SPF generates wet steam of a quality of 47%. The SPF at 190 bar and 337° C. can be stored in the SPF storage tank in the daytime, and discharged in the night to operate the desalination unit. Even though the states E, H1 and H2 are located at the same point in the pressure temperature diagram on the vapor-liquid saturation line, the points are for the thermodynamic states having different quality of steam with E at a quality of 0%, H1 at 64% and H2 at 47%. Therefore, when the desalination unit requires more steam, the SPF can be made at higher temperatures and, on the contrary, when the desalination unit requires less steam, the SPF can be generated at lower temperatures.

The steam is used as motive steam for the steam jet ejector in TVC or MED-TVC unit. Since the brine feed will be in different concentrations of salts periodically, the operating temperature is dependent upon the concentration of salts in the brine feed to be treated. For example, the desalination temperature for the brine concentrate feed will be higher than that for the fresh brine feed due to the boiling point elevation, which will eventually require higher vacuum, too. Therefore, the desalination unit needs to be supplied with the wet steam of a steam quality required for the type of brine feed to be treated. The required steam quality can be attained by using the SPF generated at the right temperature and pressure. For example, in FIG. 2, when H2 is at the required steam quality and pressure for the desalination operation with a quality of 47% at 2.7 bar, the state for the SPF generation is on the vertical isenthalpic line passing the points H2, G2 and G3. However, point G2 is found optimum, so the SPF is generated at G2 at 190 bar and 337° C.

Also, the single-phase fluid (SPF) enables an easier heat transfer in the CSP receivers, since the segregation of different phases can be prevented. The phase segregation takes place in two phase region of vapor-liquid of water below the critical point. Therefore, the SPF generation makes the separate zones for water preheating, steam evaporation, and steam superheating unnecessary unlike the subcritical steam generation. Generation of SPF by once-through heating for use in the solar thermal desalination is a very energy efficient process.

In Table 1, the specific volumetric enthalpy of SPF at critical point of water, at 250 bar and 380° C., at 250 bar and 340° C., at 190 bar and 337° C., and at 20 bar and 190° C. is compared.

TABLE 1

Specific Volumetric Enthalpy of SPF

|  | Critical Point | SPF (1) | SPF (2) | SPF (2) | SPF (2) |
|---|---|---|---|---|---|
| Pressure (Bar) | 220.64 | 250.0 | 250.0 | 190.0 | 20.0 |
| Temperature (° C.) | 373.95 | 380.0 | 340.0 | 337.0 | 190.0 |
| Specific Volumetric Enthalpy (MJ/m$^3$) | 671.1 | 872.6 | 1020.3 | 1000.4 | 708.2 |
| Volumetric Heat Content (MJ/m$^3$) | 424.8 | 626.3 | 774.0 | 754.1 | 461.9 |
| Density (kg/m$^3$) | 322.0 | 450.8 | 655.1 | 642.3 | 876.7 |
| Steam Quality at 5 Bar (%) | 69 | 62 | 44 | 44 | 8 |
| Steam Quality at 30 Bar (%) | 60 | 52 | 31 | 31 | N/A |

Notes:
(1) Single-phase Fluid (SPF) in Supercritical Water Region.
(2) Single-phase Fluid (SPF) in Pressurized Liquid Water Region.

As shown in Table 1, the SPE at 250 bar and 380° C. has a specific volumetric enthalpy being 47% larger than that of the steam at critical point of water while making wet steam of a quality of 60% when expanded to 30 bar by an isenthalpic process. On the other hand, the SPF at 250 bar and 340° C. has a specific volumetric enthalpy being 82% larger than that of the steam at critical point of water while making wet steam of a quality of 31% when expanded to 30 bar by an isenthalpic process. Therefore, for a given volume of storage capacity, the SPF at 250 bar and 340° C. can store thermal energy by 24% more than that of SPF at 250 bar at 380° C. even though the operating temperature is lower by 40° C. When the desalination unit needs more steam to run the MED-TVC unit at higher temperatures around 110° C. or higher with a steam jet ejector, the SPF at 250 bar and 380° C. will be preferable to that at 340° C. When the desalination unit needs less steam to run the MED-TVC at temperatures around 70° C. or lower with a steam jet ejector, however, the SPF at 190 bar and 337° C. will be preferable to that at 380° C. The SPF as a TES medium and HTF in this invention makes the CSP unit generate the SPF at the optimum pressure and temperature for the desalination unit so that the brine feed of the different concentrations of salts can be effectively treated. The optimum means the lowest in cost while achieving the goal safely In table 1, the SPF at 190 bar and 337° C. has a specific enthalpy of 1557.5 kJ/kg being the same as that of the SPE at 250 bar and 340° C., even though the operating pressure is lower by one quarter with 60 bar. The steam at 190 bar and 337° C. can be obtained by an isenthalpic expansion from 250 bar at 340° C. to 190 bar. A risk in generating the SPF at 190 bar and 337° C. directly rather than by an isenthalpic expansion is that the operating condition is too close to the saturation liquid line at 190 bar and 361.5° C. with a margin of only 24.5° C. and could enter into the two phase region of water causing uneven heat transfer due to the segregation of phases. This risk can be overcome by providing a proper instrumentation. For example, in a LFR receiver, increasing the flow rate of the SPF will lower the outlet temperature for a given heat input. With a proper instrumentation providing such protective response, the once-through generation of the SPF at 190 bar at 337° C. is preferred to the generation at 250 bar at 340° C., because the lower pressure will reduce the parasitic power consumption for pumping.

The SPF at 20 bar and 190° C. has a specific volumetric enthalpy about 5% higher than that of the water at critical point. It generates wet steam at a quality of 12% when it is expanded to 2.7 bar. The low pressure steam above 2 bar (absolute) can be used as motive steam for steam jet ejectors in TVC and MED-TVC units. At this steam quality, the wet steam has a vapor concentration of 99% by volume. The steam condensate at 2.7 bar and 130° C. can be used as a HTF for sensible heat transfer. Especially, its temperature and pressure are high enough for heat transfer with heat exchangers.

The specific volumetric heat content of the SPF is compared with that of thermal oil and solar salt in Table 2. The specific volumetric heat content for the SPF means the amount of enthalpy to be harnessed in a unit volume in a thermal process. Since the datum point for this desalination process is the saturation liquid at 130° C. and 2.7 bar as shown at point A in FIG. 1, the specific volumetric heat content can be obtained by subtracting the specific volumetric enthalpy of saturated water at 130° C. and 2.7 bar at point A from the specific volumetric enthalpy at 380° C. and 250 bar at point C in FIG. 1. Among the four CSP technologies available e.g., linear Fresnel reflectors (LFR), parabolic trough (PT), parabolic dish (PD), and solar power tower (SPT), the LFR is chosen as an example, because it is the cheapest option among the four types of CSP technologies. For thermal oil, the highest temperature that can be used is assumed to be 380° C. since it starts to disintegrate above 400° C. For solar salt, it is assumed that it can be used from 390° C., the highest temperature from a LFR, even though it can be used up to 600° C. above which it disintegrates. On the other hand, the LFR generates thermal energy at 390° C. at the maximum. For the temperature at which they could be cooled for sensible heat utilization, the thermal oil is assumed to be cooled to 130° C. with the temperature difference allowance of 20° C. for heat transfer to heat the brine up to 110° C., and the solar salt to be cooled down to 270° C. with a safety margin of about 50° C. above its freezing point of 222° C.

TABLE 2

Volumetric Heat Content of SPF, Thermal Oil, and Solar Salt

| Medium | SPF | Thermal Oil | Solar Salt |
|---|---|---|---|
| Melting Temperature (° C.) | 0 | 12 | 222 |
| Density (kg/m$^3$) | 450.8 (1) | 810 (2) | 1890 (2) |
| Heat Capacity (kJ/kg · K) | N/A | 2.35 (2) | 1.51 (2) |
| Temperature Range (° C.) | 380-130 | 380-130 | 390-270 |
| Enthalpy Difference for Desalination (kJ/kg) | 1389.3 | N/A | N/A |
| Volumetric Heat Content (MJ/kg/m$^3$) | 626.3 | 475.9 | 342.5 |

Note:
(1) At 380° C. and 250 Bar
(2) At 300° C.

A comparison shows that the volumetric heat content of SPF at 250 bar and 380° C. is about 32% higher than that of the thermal oil and about 83% higher than the solar salt. Considering that the price of water is below $5/m$^3$ while the solar salt costs $2000/m^3$ and the thermal oil $25000/m^3$, SPF is a superior material to other options as a TES medium and HTF for the application in this solar desalination system.

Figure 4:
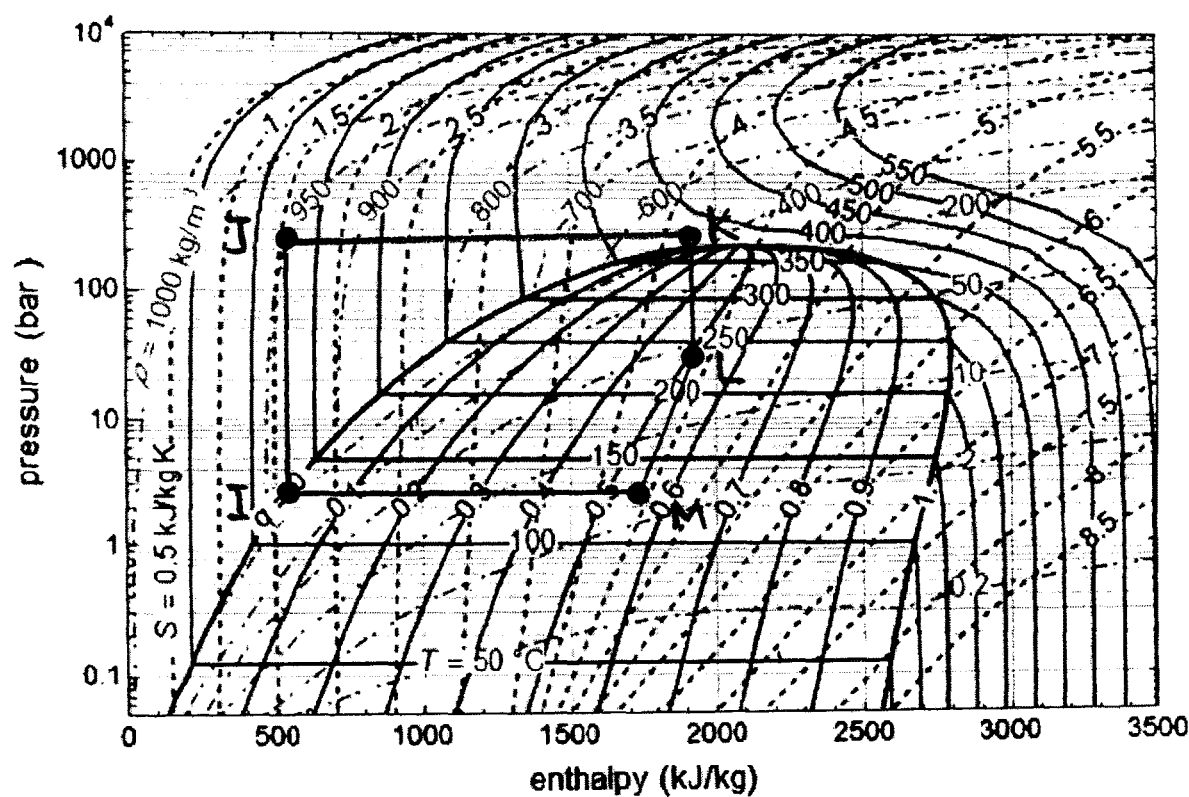
FIG. 4 is a pressure enthalpy diagram for water with isenthalpic and isentropic expansion in series of single-phase fluid (SPF)

In FIG. 4, a thermodynamic cycle for the solar desalination system is illustrated where a pressure reducer for isenthalpic expansion and an electric generator for isentropic expansion are operating in series. When electricity is generated by using the steam from the SPF through the two phase region of steam, the existence of condensate liquid makes it difficult to use high speed turbines. Some specially designed expanders for this situation requires low axial speed, low operating pressure, and a low pressure drop between the inlet and outlet of the expander. In this case, a pressure reduction valve or isenthalpic expander will be needed in front of the isentropic expanding machine. In some cases, after the system pressure is reduced first to a required level, several electric generators can be used in series in order to meet the requirement for the maximum pressure drop for each unit.

In FIG. 4, the steam condensate at 130° C. and 2.7 bar at point I is pumped to 250 bar and about 130° C. at point J, and then heated to 380° C. and 250 bar at point K. The SPF is then firstly expanded by an isenthalpic expansion valve to a lower pressure of around 30 bar at point L, and then further expanded in an isentropic expander to 2.7 bar at 130° C. at point M for electric generation. In this process, about 19% of the total energy available with 261.8 kJ/kg has been used for electric generation while 81% of the total energy with 1145.6 kJ/kg remaining for desalination in MED and MFD units. The low pressure steam above 2 bar (absolute) can be also used as motive steam for steam jet ejectors in TVC and MED-TVC units for desalination. At point M, steam quality is 53% at 2.7 bar and 130° C. The recycling thermal energy in the MED-TVC unit can make appreciable improvement on PR.

Figure 7:
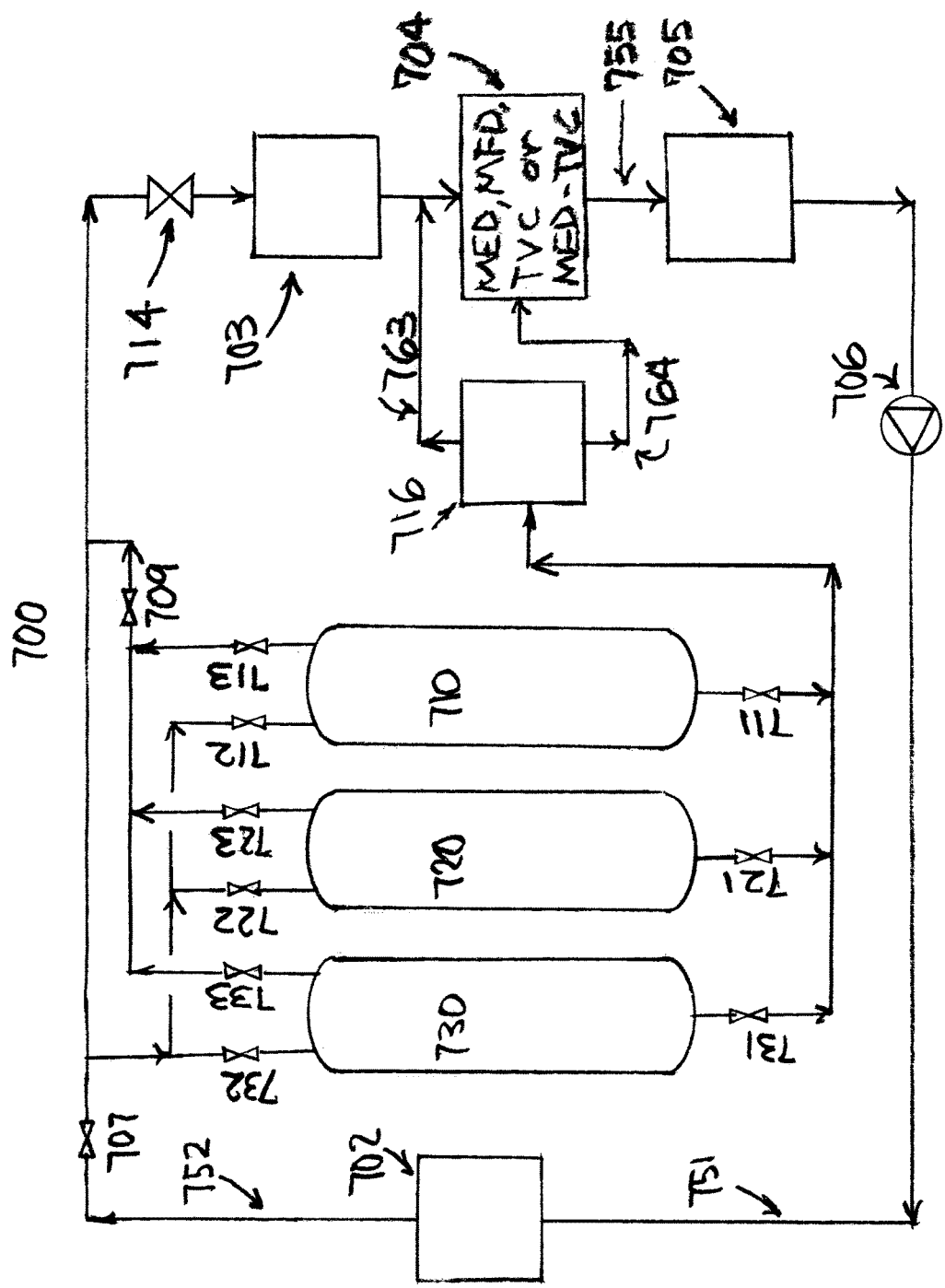
FIG. 7 is a schematic diagram of another embodiment of a solar desalination system of the present invention with a plurality of storage tanks operating isenthalpic and isentropic expanders in series for MED, MFD, TVC, or MED-TVC unit.

System 700 in FIG. 7 comprises a plurality of SPF storage tanks, and an isenthalpic expander for pressure reduction and an isentropic expander for electricity generation operating in series. It also comprises MED, MFD, TVC, or MED-TVC for the desalination system. In the daytime, the steam condensate at temperature of 130° C. at 2.7 bar from steam condensate tank 705 is pumped by pump 706 to a pressure of 250 bar at around 130° C. for stream 751, and then heated by CSP unit 702 to 380° C. and 250 bar for stream 752. The pressure of the SPF is then reduced by pressure reducer 714 to a pressure of 30 bar for the electricity generator 703. The exit steam from the electricity generator at 2.7 bar at 130° C. can be used to supply thermal energy for MED or MFD unit. The low pressure steam combined with the flash steam 763 from condensate flash drum 716 is fed to desalination unit 704. The flash steam 763 and condensate 764 from the condensate flash tank 716 are sent under close flow control to desalination unit 704 for heat recovery. The condensate 755 from desalination unit 704 collects in condensate tank 705. Also, the exit steam from the electricity generator can be used to operate TVC or MED-TVC unit by feeding the low pressure steam to the steam jet ejector as motive steam. In fact, the low pressure steam above 2 bar (absolute) can be used as motive steam for steam jet ejector in TVC or MED-TVC unit.

During the daytime, thermally charged SPF at 380° C. and 250 bar is also stored in SPF storage tanks 710, 720 and 730. At this time, valve 709 is closed and valve 707 opened. The storage tanks are all empty at the start of charging, and receive SPF in sequence operation. For charging the SPF into tank 710, valve 712 is opened and valve 711 and valve 713 are closed. While the pressure of tank 710 rises to the storage pressure of 250 bar, any condensate formed is removed by opening valve 711 and sent to condensate flash tank 716 where the flash steam 763 and the condensate 764 are sent to the desalination unit 704 for heat recovery. When tank 710 is fully charged at 250 bar, valve 712 is closed while starting to charge into storage tank 720. At this time, valve 722 is opened, and valve 721 and valve 723 are closed. While the pressure of storage tank 720 rises to the storage pressure of 250 bar, any condensate formed is removed by opening valve 721 and sent to condensate flash tank 716. When tank 720 is fully charged at 250 bar, valve 722 is closed while starting to charge into storage tank 730. At this time, valve 732 is opened, and valve 731 and valve 733 are closed. While the pressure of storage tank 730 rises to the storage pressure of 250 bar, any condensate formed is removed by opening valve 731 and sent to condensate flash tank 716. When tank 730 is fully charged at 250 bar, valve 732 is closed.

During the nighttime, the SPF storage tanks discharge SPF to operate desalination unit 704. At this time, valve 709 is opened and valve 707 closed. The storage tanks have been all fully charged at 250 bar at the start of discharge, and supply SPF in sequence operation. For discharging SPF from tank 710, valve 713 is opened with valve 711 and valve 712 being closed. While the pressure of tank 710 decreases to the final storage pressure of 30 bar, any condensate formed is removed by opening valve 711 and sent to condensate flash tank 716. The flash steam 763 and condensate 764 from the condensate flash tank 716 are sent to the desalination unit 704 for heat recovery. When tank 710 is fully discharged at 30 bar, valve 713 is closed while starting to discharge from storage tank 720. At this time, valve 723 is opened and valve 721 and valve 722 are closed. While the pressure of storage tank 720 decreases to the final storage pressure of 30 bar, any condensate formed is removed by opening valve 721 and sent to condensate flash tank 716. When tank 720 is fully discharged at 30 bar, valve 723 is closed while starting to discharge from storage tank 730. At this time, valve 733 is opened, and valve 731 and valve 732 are closed. While the pressure of storage tank 730 decreases to the final storage pressure of 30 bar, any condensate formed is removed by opening valve 731 and sent to condensate flash tank 716. When tank 730 is fully discharged at 30 bar, valve 733 is closed.

Figure 8:
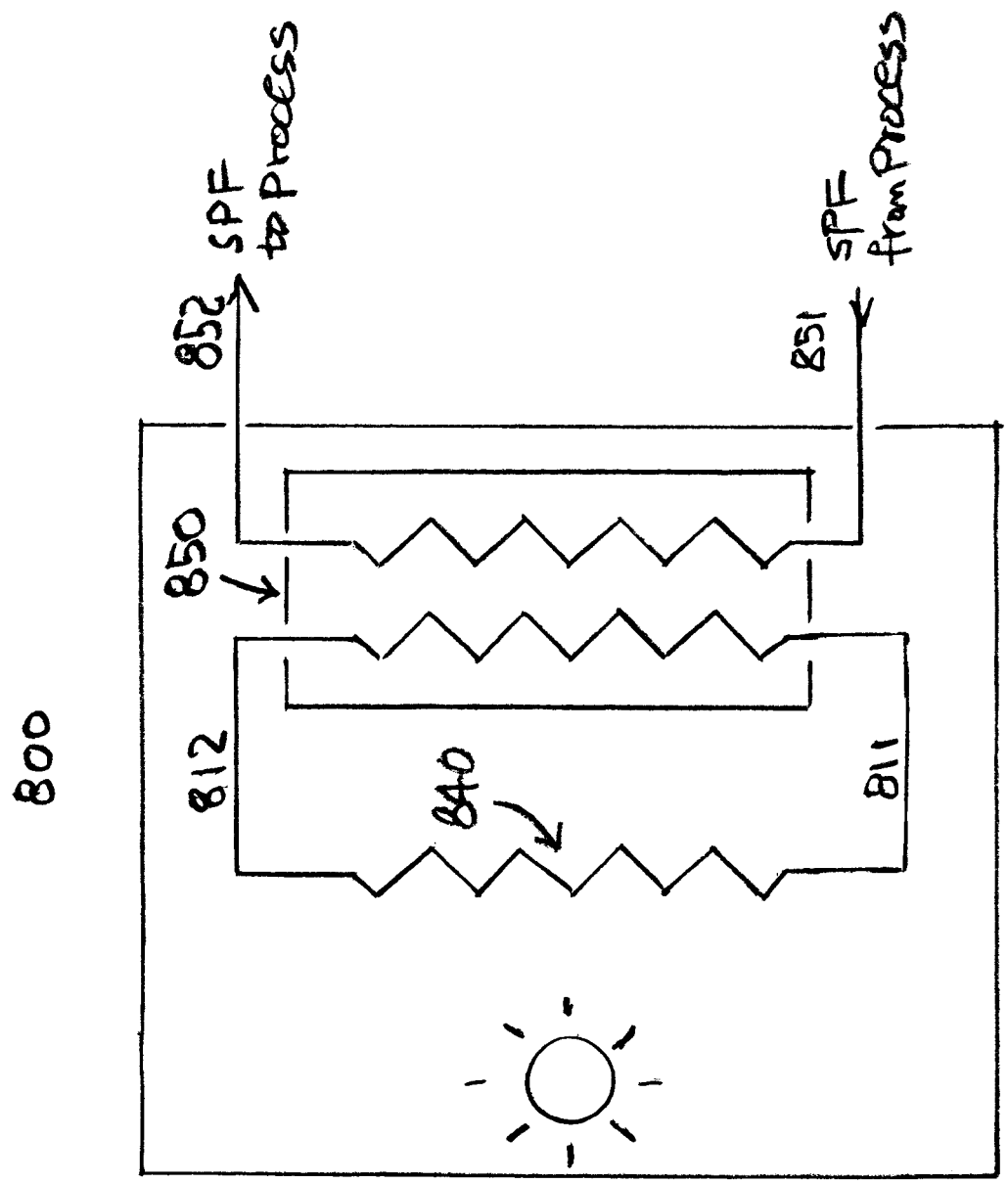
FIG. 8 is a schematic diagram of an embodiment of a single-phase fluid (SPF) production system of the present invention by once-through generation in heat exchange with a HTF from a CSP unit.

In FIG. 8 is shown the single-phase fluid (SPF) generation system 800 in heat exchange with a HTF from a CSP unit. The SPF stream 851 pressurized at 250 bar is heated by an once-through generation process in heat exchange with the HTF stream 812 in heat exchanger 850. The HTF stream 811 is heated in receiver 840 of any of the four types of the CSP technologies LFR, PT, PD, and SPT, and stream 812 carries thermal energy to SPF stream 851. In the case when a LFR is used as a CSP unit, the HTF stream 812 having been heated up to 390° C. in the LFR unit at the highest supplies thermal energy to the inlet SPF stream 851 at 250 bar and 130° C. in the heat exchanger to a temperature of 380° C. for the outlet stream 852. The SPF stream 852 is sent to one of the four desalination processes MED, MFD, TVC, and MED-TVC. In this heat transfer process, smooth heat transfer can be ensured for the SPF stream without segregation of phases, because the heat transfer takes place in single-phase through the pressurized liquid water region and then supercritical water region. Therefore, separation of heating zone into three zones for water preheating, water evaporation and steam superheating is not necessary in this SPF generation system unlike the situation in the subcritical boilers.

Figure 9:
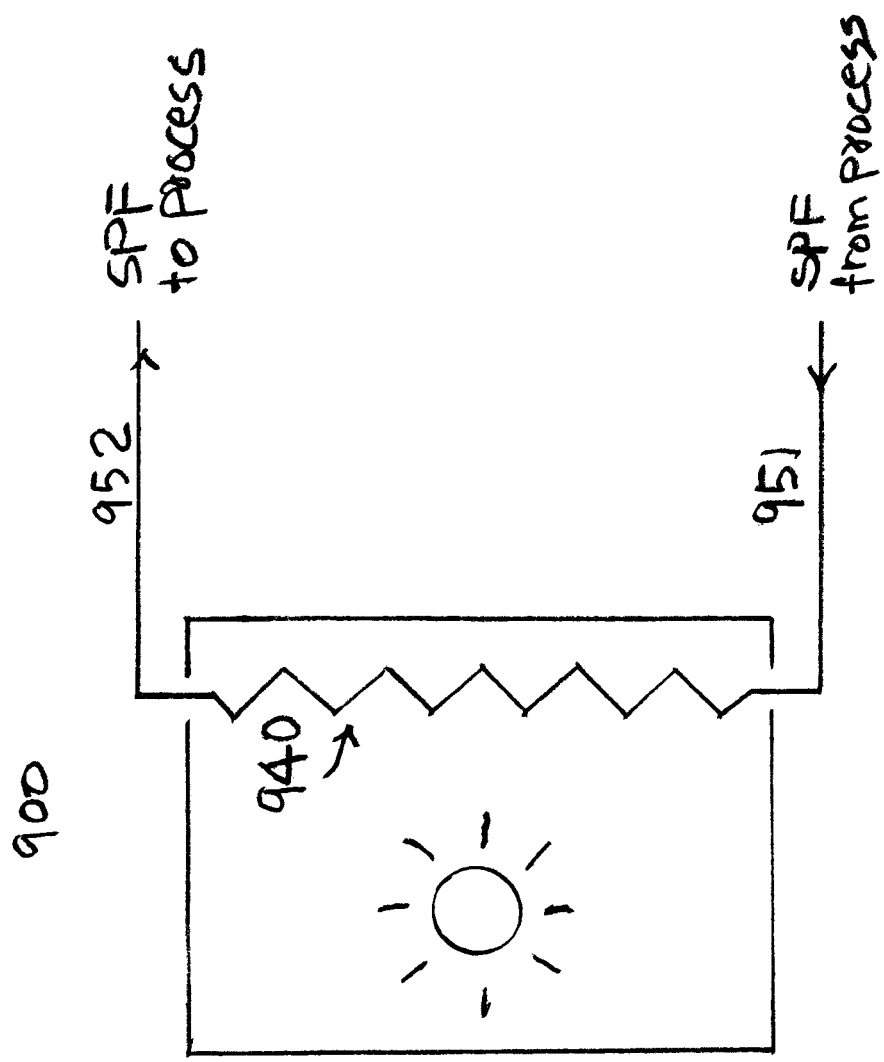
FIG. 9 is a schematic diagram of another embodiment of a single-phase fluid (SPF) production system of the present invention by once-through generation in a receiver of a CSP unit.

In FIG. 9 is shown the SPF generation system 900 employing the once-through generation of a CSP unit. In this system, the inlet SPF stream 951 is heated in receiver 940 of any of the four types of CSP technologies LFR, PT, PD, and SPT. In the case when LFR is used as a CSP unit, the inlet SPF stream 951 at 250 bar and 130° C. is heated up to the desired temperature of 380° C. for the outlet stream 952 at constant pressure of 250 bar. The SPF stream 952 is sent to one of the four desalting processes MED, MFD, TVC, and MED-TVC. In this heating process, smooth heat transfer is ensured because the SPF is heated in single-phase through the pressurized liquid region and then the supercritical water region. This once-through generation process makes separation of the steam generation process into three sections for water preheating, water evaporation, and steam superheating unnecessary, which would be required for subcritical steam boilers. Especially, the once-through generation process makes the heat exchanger system unnecessary, which would include the HTF circulation system and heat exchangers, resulting in appreciable reduction of investment cost.

The SPF generates steam and liquid water in saturation at the operating pressures to which the SPF expands into the two phase region of water below critical point at 211 bar and 374° C. as illustrated in the pressure enthalpy diagrams in FIG. 1, FIG. 2, and FIG. 4. The steam can be used as motive steam for steam jet ejectors, a power medium to drive a turbine to generate electricity, or a heating medium for desalination unit. The steam condensate of the SPF is used as a heating medium for desalination unit, since it is at the temperature and pressure being high enough for heat transfer with heat exchangers. For the MED and MFD units, they must be designed to utilize both the steam and the condensate. For the TVC and MED-TVC units, on the other hand, they must be designed to operate using either the high pressure steam at 30 bar without electricity generation or the low pressure steam above 2 bar with electricity generation. In fact, the low pressure steam above 2 bar (absolute) can be used as motive steam for steam jet ejectors in TVC and MED-TVC units. An advantage of the solar desalination system of this invention is that the SPF can be generated at the optimum pressure and temperature where the necessary amount of steam can be attained at the pressure required for the desalination unit.

Figure 10:
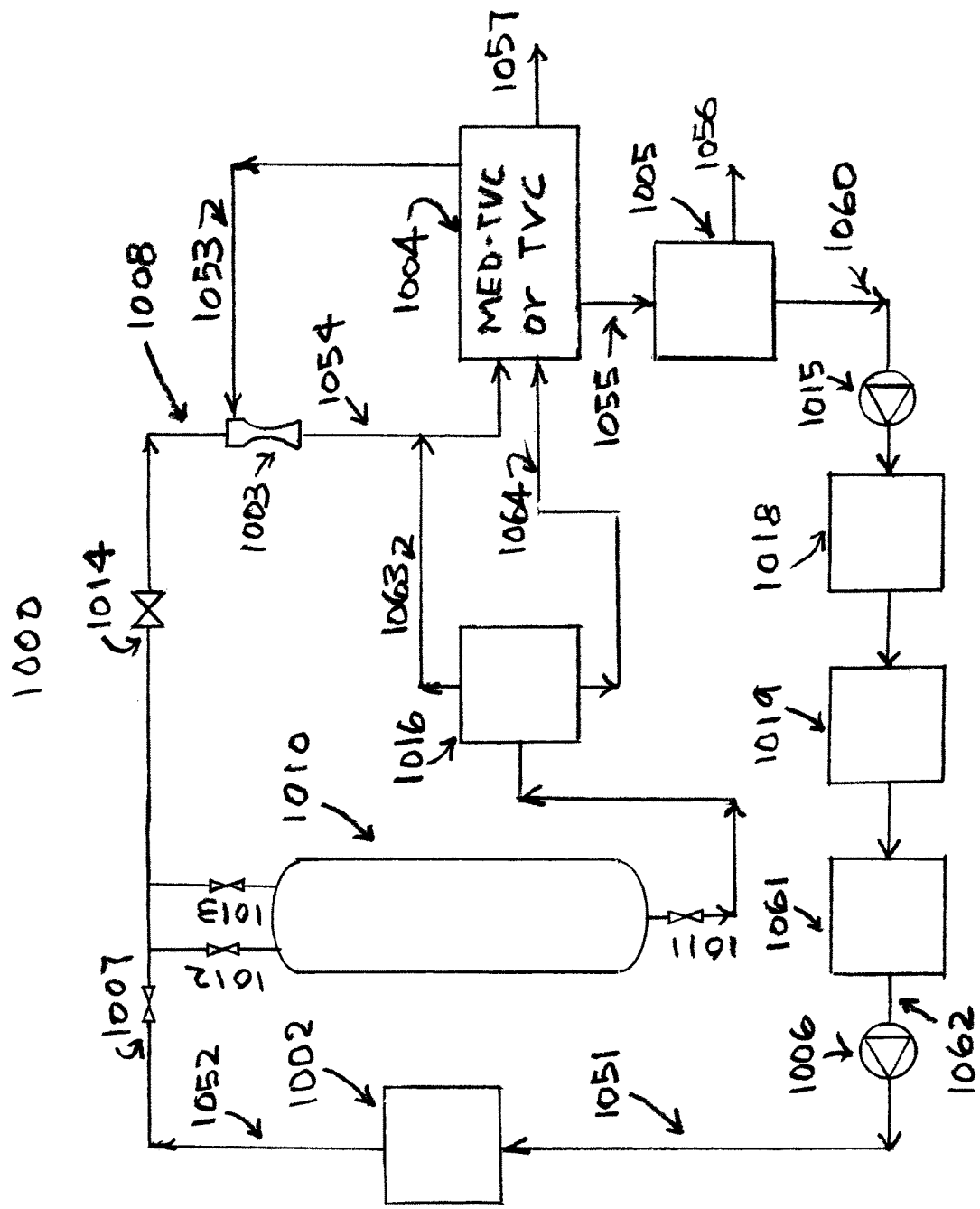
FIG. 10 is a schematic diagram of another embodiment of a solar desalination system of the present invention having a TVC or a MED-TVC unit.

In FIG. 10 is illustrated a solar desalination system (SDS) 1000 comprising a MED-TVC or a TVC. In the daytime, steam condensate water is pumped by low pressure pump 1015, treated by condensate polishing unit 1018, deaerator 1019 and oxygenated water treatment (OWT) unit 1061, pumped by high pressure pump 1006 to a pressure of 250 bar, and heated by CSP unit 1002 to a temperature of 380° C. for stream 1052. The SPF stream 1052 is then fed to isenthalpic pressure reducing valve 1014 by opening valve 1007. The pressure reducing valve exit stream 1008 is charged to the steam jet ejector 1003 as motive steam. Motive steam 1008 combined with the water vapor 1053 makes discharge steam mixture 1054 from steam jet ejector 1003. The discharge steam mixture 1054 and flash steam 1063 from condensate flash tank 1016 are fed to the desalination unit 1004 supplying thermal energy to operate the unit. Condensate 1064 from condensate flash tank 1016 is also sent to the desalination unit for heat recovery. The condensate 1055 from the desalination unit 1004 collects in condensate tank 1005 at 50° C. The condensate stream 1060 from condensate storage tank 1005 is recycled as a SPF generation feed water. The condensate feed water 1060 at 50° C. and atmospheric pressure (1.013 bar) is pumped by low pressure pump 1015 and then treated by condensate polisher 1018 at 50° C., deaerator 1019 at 105° C. and 1.2 bar, and oxygenated water treatment (OWT) 1061 with oxygen injection at 105° C. The condensate feed water 1062 at 105° C. is pressurized by high pressure pump 1006 to a pressure of 250 bar for stream 1051, and fed to CSP unit 1002. The condensate feed water 1051 at about 105° C. at 250 bar is heated to 380° C. at constant pressure by once-through generation in CSP unit 1002.

The steam jet ejector 1003 compresses water vapor stream 1053 under vacuum by using high pressure steam 1008 at pressure of 30 bar as motive steam in order to generate discharge steam mixture 1054 at pressures higher than the suction pressure. SDS 1000 of this invention has been designed with motive steam at 30 bar, but the low pressure steam above 2 bar (absolute) can be used as motive steam for steam jet ejectors in TVC and MED-TVC units. Since the ejector nozzle design of the steam jet ejector does not allow high turn down ratio, the ejector system must be designed for the optimum performance at the specific operating conditions such as the pressure, temperature, and flow rates of the suction water vapor, motive steam, and discharge steam mixture streams so that the unit can operate without appreciable deviation from the optimum performance during normal operation. For the desalination of high-salt water, however, it is difficult to expect that a single steam jet ejector will provide sufficient performance for all desalination temperatures such as around 110° C., 70° C., and 45° C. Installation of a separate set of ejector system for each of the specific performances will be found more advantageous.

The water vapor stream 1053 is withdrawn from the desalination unit 1004 containing thermal energy as much as the enthalpy of vaporization of water vapor, and recycled through steam jet ejector 1003. The sum of the thermal energy of stream 1052 from CSP unit 1002 and that of stream 1053 from the desalination unit is used to operate the desalination unit 1004. Therefore, for a given amount of thermal energy needed for operation of the desalination unit, the thermal energy to be supplied from CSP unit 1002 is determined by the amount of the recycling thermal energy contained in stream 1053. A remarkable advantage of this solar desalination system is that the capacity and the installation cost of the CSP unit and the TES system can be reduced as much as the thermal energy recycled with stream 1053.

In the daytime, SPF storage tank 1010 is also charged with the SPF by closing valve 1013 and valve 1011 and opening valve 1007 and valve 1012. The storage tank has storage capacity of 16 hours so that it can supply SPF for operation of the desalination unit during the night. Any condensate formed during charging is withdrawn by opening valve 1011, and sent to condensate flash tank 1016. The flash steam 1063 and condensate stream 1064 from condensate flash tank 1016 are sent to the desalination unit 1004 for heat recovery under accurate flow control.

In the night, the SPF is supplied to desalination unit 1004 from SPF storage tank 1010 by closing valve 1007 and valve 1012 and opening valve 1013. The SPF is sent to the isenthalpic pressure reducing valve 1014 and then to the steam jet ejector 1003 as motive steam. The condensate formed during discharging the SPF is sent to condensate flash tank 1016. The flash steam 1063 and condensate 1064 from condensate flash tank 1016 are sent to desalination unit 1004 for heat recovery under accurate flow control. The total condensate 1055 from desalination unit 1004 collects in condensate storage tank 1005 during the night. The condensate stored in the storage tank is recycled to produce SPF when the CSP unit starts operation in the morning.

For a MED-TVC unit in FIG. 10, the discharge steam mixture from steam jet ejector 1003 is fed to the first effect heat exchanger. In the first effect, thermal energy is transferred to the brine feed stream generating water vapor, while the discharge steam mixture condenses in the evaporator. The water vapor from the first effect condenses in the second effect evaporator producing product distillate, while generating another stream of water vapor from the brine feed stream. The water vapor from the second effect condenses in the third effect evaporator producing product distillate, while generating another stream of water vapor from the brine feed stream. This water vapor from the third effect is fed to the fourth effect evaporator to repeat the steps until the last effect. In the last effect evaporator, a part of the water vapor in stream 1053 is fed to the suction of the steam jet ejector, while the remaining water vapor is condensed as a part of product distillate in stream 1057. The water vapor fed to the suction of the steam jet ejector is mixed with the motive steam in the steam jet ejector nozzle to generate the discharge steam mixture. The condensate of the discharge steam mixture from the first effect evaporator collects in the condensate storage tank, where the condensate in an amount of the water vapor in stream 1053 from the last effect evaporator is withdrawn as a part of the product distillate in stream 1056. Owing to the heat recovery by the water vapor recycling through the steam jet ejector, a MED unit having a performance ratio (PR) of 9 will achieve a PR of about 11 to 15 by addition of a steam jet ejector with the water vapor recycling of 20% to 40%, respectively. The water vapor recycling enables reduction of the capacity of the CSP and TES units as much as the energy saved by the water vapor recycling. For example, the installation cost of the SPF storage unit is assumed to be about 50% of that of the desalination unit. Also, the cost of the CSP unit such as LFR is about 170% as much as that of the desalination unit. The goal of this patent is to recycle 20% to 40% of the water vapor generated in the last effect of the desalination unit. This recycling will enable the solar desalination system to produce the fresh water at a price being reduced by about 14% to 28%, respectively, compared to the case where no energy recycling is made.

For a TVC unit in FIG. 10, the discharge steam mixture from the steam jet ejector is fed to the main heat exchanger where the preheated hot brine liquid feed is heated to vaporize in heat exchange with the condensing discharge steam mixture. The water vapor portion of the brine feed is pulled in total to the suction of the steam jet ejector, and mixed with the motive steam to form the discharge steam mixture which is fed again to the main heat exchanger to vaporize the incoming preheated brine feed. SDS 1000 of this invention has been designed with motive steam at 30 bar, but the low pressure steam above 2 bar (absolute) can be also used as motive steam for steam jet ejectors in TVC units. The condensate of the discharge steam mixture collects in the condensate storage tank. The condensate of the motive steam for TVC unit must be in a compatible quality with the product distillate. Otherwise, a steam transformer is mandatory in order to produce compatible motive steam in heat exchange with the steam from the utility plant. Since the quality of the SPF condensate is better than that of the product distillate, no steam transformer will be needed for the SDS of this invention. The incoming cold brine feed stream is preheated in heat exchange with the brine concentrate stream and also with the condensate stream of the discharge steam mixture at the same time. At this time, the exit temperatures of the cooled brine concentrate stream and the cooled condensate stream of the discharge steam mixture must be minimized based on the price of the steam from the CSP units rather than that of the low pressure steam from the utility plants. The product distillate in an amount of the water vapor portion of the brine feed is withdrawn from the condensate storage tank. Usually, a TVC unit produces up to 3000 $m^3$/day of fresh water which can be supplied as domestic water for about 3,000 families. The TVC unit in combination with a CSP heat source and the SPF storage of this invention is a promising option for drinking water supply from high-salt groundwater in arid rural areas.

For the make-up (feed) water to the SPF generation system, the product distillate can be used unless any other water sources are available for all the desalination units of MED, MFD, TVC, and MED-TVC. Since the quality of the condensate of the SPF is better than the desalination distillate with the TDS being less than 0.5 mg/liter for the former while 25-50 mg/liter for the latter, the SPF condensate is not allowed to mix with the product distillate by other than the process reasons. For generation of the SPF conforming to the specification of the supercritical steam, the product distillate needs to be treated by a condensate polisher containing ion exchange resins and an oxygenated water treatment (OWT) unit. For generation of the SPF of the lower pressures in the pressurized liquid water region, however, the OWT is not necessary since the oxygen level in the SPF feed water must be kept at the minimum. The OWT is the most effective in preventing corrosion for the SPF storage tanks when they contain dry supercritical steam. The most effective oxygen level for the SPF feed water can be determined when the operating conditions of the desalination unit are decided.

The present invention may be embodied in other specific forms without departing from its spirit or essential characteristics. The described embodiments are to be considered in all respects only as illustrative and not restrictive. The scope of the invention, therefore, will be indicated by claims rather than by the foregoing description. All changes, which come within the meaning and range of equivalency of the claims, are to be embraced within their scope.

I claim:
1. A solar desalination system comprising:
   a. a concentrated solar power (CSP) unit for supplying thermal energy to heat a single-phase fluid (SPF) as a thermal energy storage (TES) medium and heat transfer fluid (HTF);
   b. a storage tank for storing said SPF to save thermal energy from said CSP unit;
   c. an expander for generating electricity;
   d. a thermal desalination unit for producing fresh water from high-salt water by a desalination operation;
   e. a condensate tank for storing the condensate water from said SPF; and
   f. a condensate pump for pressurizing said condensate water to an operating pressure of said SPF;
   wherein the solar desalination system generates both steam for utilization of latent heat and steam condensate for sensible heat upon depressurization from said SPF;
   wherein during the daytime said SPF having a first pressure is charged to said storage tank having a second pressure, said storage tank having a drain valve to remove steam condensate formed, wherein said SPF is charged until the second pressure reaches the first pressure, wherein additional SPF in the amount of the thermal energy contained in the removed steam condensate is charged to the storage tank; and wherein during the night said SPF is discharged with the storage tank pressure decreasing until the pressure of said storage tank reaches a desired low pressure, wherein the steam condensate formed during the charging and discharging of said SPF is removed and sent to a steam condensate flash tank for heat recovery.

2. The solar desalination system of claim 1, wherein said SPF is produced in single-phase by once-through generation from said condensate water at operating pressures between 20 bar and 300 bar and at operating temperatures between 190° C. and 400° C. above the saturation liquid line in a pressure enthalpy diagram for water.

3. The solar desalination system of claim 2, wherein said SPF is defined as the fluid existing in single-phase as a pressurized liquid water at temperatures between 190.0° C. and 374.0° C. and at pressures between 20 bar and 220.6 bar, and as a supercritical water at temperatures between 374.0° C. and 400.0° C. and at pressures between 220.6 bar and 300.0 bar, wherein 374.0° C. and 220.6 bar are the critical temperature and pressure of water, respectively.

4. The solar desalination system of claim 3, wherein said SPF has a specific volumetric enthalpy higher than 671.1 MJ/m$^3$.

5. The solar desalination system of claim 1, wherein said CSP unit is selected from a group consisting a linear Fresnel reflector (LFR), a parabolic trough (PT), a parabolic dish (PD), and a solar power tower (SPT).

6. The solar desalination system of claim 1, wherein said thermal desalination unit is operated using a method selected from a group consisting multistage flash distillation (MFD), multiple effect distillation (MED), thermal vapor compression (TVC), and multiple effect distillation-thermal vapor compression (MED-TVC).

7. The solar desalination system of claim 6, wherein the TVC uses a motive steam generated from the SPF having a steam condensate that is of compatible quality with the fresh water produced.

8. The solar desalination system of claim 6, wherein the MED-TVC uses a motive steam generated from the SPF having a steam condensate, the steam condensate that is of compatible quality with the fresh water produced.

9. The solar desalination system of claim 6, further comprising a polishing unit having ion exchange resins, the polishing unit receiving the condensate water from the SPF from said thermal desalination unit.

10. The solar desalination system of claim 9, further comprising an oxygenated water treatment (OWT) unit, the OWT unit receiving the condensate water from the SPF from said polishing unit.

11. The solar desalination system of claim 1, wherein the expander includes an expansion valve allowing said SPF to expand with an enthalpy remaining substantially constant through a single-phase region and a two-phase region of vapor-liquid until steam from said SPF reaches a desired low pressure.

12. The solar desalination system of claim 11, wherein said steam is fed to the thermal desalination unit.

13. The solar desalination system of claim 1, further comprising a steam jet ejector operably coupled to the CSP and the thermal desalination unit, the steam jet ejector operating with a motive steam from the SPF from the CSP, wherein water vapor under vacuum from the thermal desalination unit, selected from a group comprising TVC and MED-TVC, is pulled into the suction of said steam jet ejector and mixed to form a discharge steam mixture, the discharge steam mixture used as a thermal energy source for said thermal desalination unit.

14. The solar desalination system of claim 1, wherein said SPF at operating pressures between 20 bar and 300 bar and at operating temperatures between 190° C. and 400° C. is heated through the single-phase region selected from a group consisting of: (i) the pressurized liquid water region; and (ii) both the pressurized liquid water region and then the supercritical water region in sequence to an optimum state in pressure and temperature for the desalination operation; wherein heat transfer in a continuous phase is achieved by once-through generation avoiding the phase segregation in a two phase region of vapor-liquid of water below the critical point of water.

15. The solar desalination system of claim 1, wherein the thermal desalination unit receives steam condensate from the storage tank, the steam condensate flash tank or a combination thereof.

16. The solar desalination system of claim 1, wherein the thermal desalination unit is a multiple effect distillation-thermal vapor compression (MED-TVC) unit, wherein the operating capacity of the CSP unit is reduced as much as the thermal energy recycled in said MED-TVC unit.

17. The solar desalination system of claim 1, wherein the thermal desalination unit is a multiple effect distillation-thermal vapor compression (MED-TVC) unit, wherein the operating storage capacity of SPF in the storage tank is reduced as much as the thermal energy recycled in said MED-TVC unit.

* * * * *